(12) United States Patent
Mandato et al.

(10) Patent No.: US 7,181,441 B2
(45) Date of Patent: Feb. 20, 2007

(54) MANAGEMENT OF USER PROFILE DATA

(75) Inventors: Davide Mandato, Fellbach (DE); Ernö Kovacs, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 392 days.

(21) Appl. No.: 09/796,171

(22) Filed: Feb. 28, 2001

(65) Prior Publication Data
US 2001/0025280 A1    Sep. 27, 2001

(30) Foreign Application Priority Data
Mar. 1, 2000   (EP)   ................................. 00104259

(51) Int. Cl.
*G06F 17/30*   (2006.01)

(52) U.S. Cl. .................... 707/3; 707/10; 707/104.1; 709/217

(58) Field of Classification Search ............. 707/104.1, 707/1–3, 10; 705/1–2, 14, 26; 709/217, 709/229
See application file for complete search history.

(56) References Cited

U.S. PATENT DOCUMENTS

| | | | | |
|---|---|---|---|---|
| 6,044,403 | A * | 3/2000 | Gerszberg et al. | 709/225 |
| 6,119,101 | A * | 9/2000 | Peckover | 705/26 |
| 6,195,651 | B1 * | 2/2001 | Handel et al. | 707/2 |
| 6,199,082 | B1 * | 3/2001 | Ferrel et al. | 715/522 |
| 6,208,975 | B1 * | 3/2001 | Bull et al. | 705/14 |
| 6,317,718 | B1 * | 11/2001 | Fano | 705/1 |
| 6,571,279 | B1 * | 5/2003 | Herz et al. | 709/217 |

FOREIGN PATENT DOCUMENTS

| | | |
|---|---|---|
| WO | WO 98 15091 | 4/1998 |
| WO | WO 99 45691 | 9/1999 |
| WO | WO 00 04462 | 1/2000 |

OTHER PUBLICATIONS

Kilmartin L et al: "Real Time Stock Price Distribution Utilising the GSM Short Messaging Service" 1997 IEEE International Conference on Personal Wireless Communications (CAT. No. 97TH8338), 1997 IEEE International Conference on Personal Wireless Communications Conference Proceedings, Mumbai, India, Dec. 17-19, 1997, pp. 399-403, XP002155136, 1997, New York, NY, USA, IEEE, USA.

Eleftheriadis G P et al: "User Profile Identification in Future Mobile Telecommunications Systems" IEEE Network: The Magazine of Computer Communications, US, IEEE, INC. New York, vol. 8, No. 5, Sep. 1, 1994, pp. 33-39, XP000606584.

* cited by examiner

*Primary Examiner*—Sathyanarayan Pannala
(74) *Attorney, Agent, or Firm*—Oblon, Spivak, McClelland, Maier & Neustadt, P.C.

(57) ABSTRACT

The invention generally related to the field of mobile multimedia middle-ware, computer networking, distributed processing systems, data bases, hand-held computers and wireless communication. A method for conveniently managing user profile information in an unified instant messaging system (7) is proposed. This method operates on a data base structure, which accommodates in a flexible way subscribers' information. More specifically, this method takes into account the mutable characteristics of the environment where subscribers' devices (9) are operating: subscribers can in fact freely modify their personal user profiles (1) as situations change and/or as they move to different geographical locations.

19 Claims, 17 Drawing Sheets

PRIOR ART

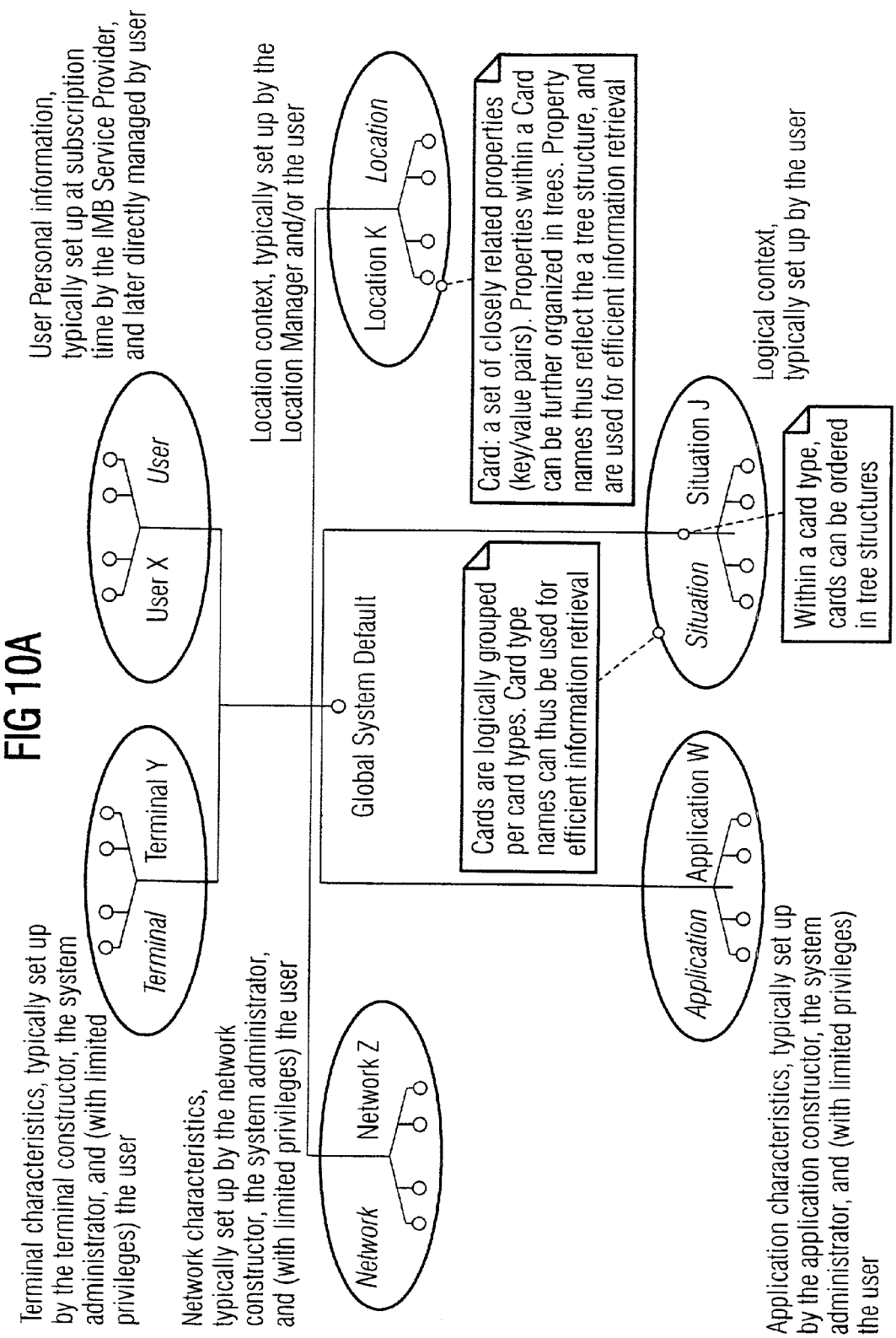

FIG 10B

*User Space*

$T_6$ = (X, Y, Z, W, J, K) : one 6-tuple
$T_5$ = {any combination of 5-tuple out of $T_6$ with one Default} : six 6-tuples
$T_4$ = {any combination of 4-tuple out of $T_6$ with two Defaults} : fifteen 6-tuples
$T_3$ = {any combination of 3-tuple out of $T_6$ with three Defaults} : twenty 6-tuples
$T_2$ = {any combination of 2-tuple out of $T_6$ with four Defaults} : fifteen 6-tuples
$T_1$ = {any combination of 1-tuple out of $T_6$ with five Defaults} : six 6-tuples
$T_0$ = (Def, Def, Def, Def, Def, Def} = Global System Default : one 6-tuple

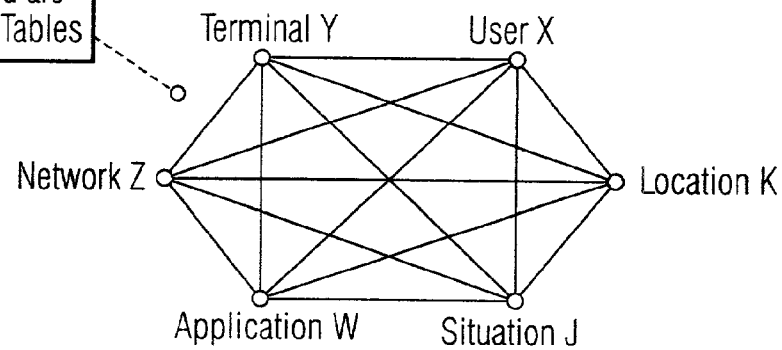

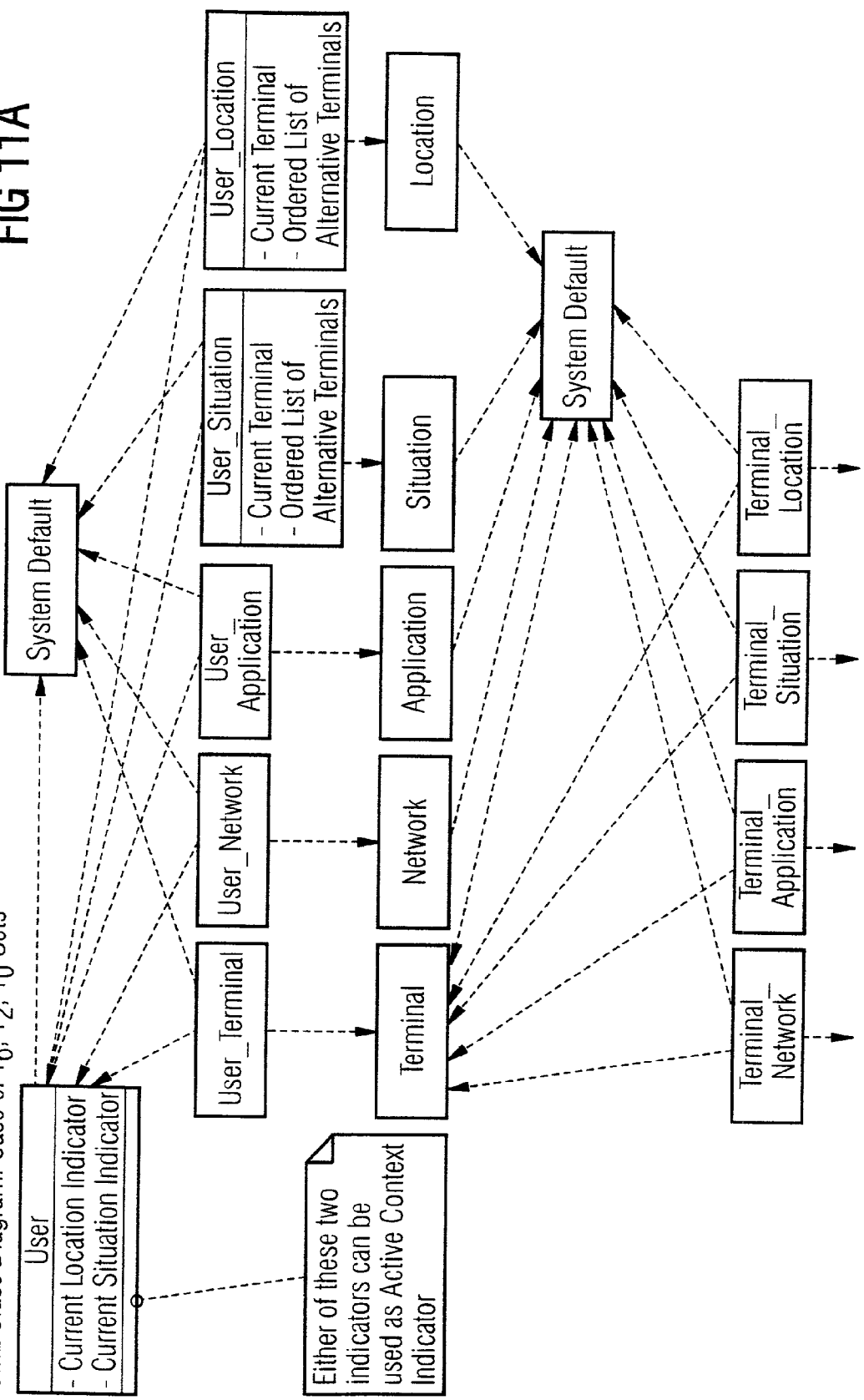

MANAGEMENT OF USER PROFILE DATA

BACKGROUND OF THE INVENTION

The present invention relates to a data base for storing and managing user profile data, to a software program for implementing such a data base, to a method for managing a user profile data base as well as to a software program for implementing such a method.

Why are people investing so much time and money in telecommunication? Mainly for two reasons: (i) to be more time-effective (i.e. saving time) and (ii) to be omnipresent (i.e. being reachable everywhere at any time). Modern telecommunication technologies—like telephone, fax, mobile phones, and the Internet—address these issues by offering a wide spectrum of services. Combined together, these services effectively help individuals saving time and even reducing cost. These various network-based services typically provide users with specific Quality of Service (QoS)-constrained functionality.

SUMMARY OF THE INVENTION

Unified Messaging Systems (UMS) bridge the gaps between the different communication means, by merging analog and digital messages—such as facsimile, voice mail, e-mail, WWW, and the cell phone short message service. In particular, one can distinguish among (i) messages such as facsimile or voice mail (which in principle may be sent over an analog telecommunication network) and (ii) digitally generated, processed and transmitted messages. Besides sheer homogeneous transmission, heterogeneous analog/digital messaging applications are also conceivable (e.g. voice mail, voice recognition with e-mail transfer, fax-to-data, data-to-fax).

Today's UMS allow messages to be originated, received, processed, transmitted, and stored independently of their type. This approach allows users to exploit different network services in a unified and integrated way. For example, a phone call, recorded as a voice message in a voice mailbox, can be sent to the recipient as an E-mail attachment. Future progress in voice recognition might even enable high-quality conversion of voice attachments into text. To summarize, UMS copes with the heterogeneity of different network-based services, by addressing message format conversion issues. UMS thus offer a seamless fabric, over which users can communicate by using whatever terminal device is available at hand.

A typical UMS drawback is the lack of support for timely information delivery: UMS rely upon the underlying network services to reach recipients on time. In order to solve this problem, Unified Instant Messaging (UIM) systems have been devised so as to allow messages to be sent in near real time between users. For achieving this goal, UIM systems have to take into account the inherent QoS characteristics of the underlying network service. Furthermore, UIM systems heavily rely upon mobile communication for interacting with roaming service users. When taking into account all these new issues, the original problem domain can be broken down into two new problem sub-domains: (i) user mobility and (ii) context-awareness.

User mobility describes the ability of the user to move between different terminals (e.g. from the office desktop PC to the laptop at home). This differs from the terminal mobility case where the terminal moves without losing the connection to the network. The terminal devices must then cope with either horizontal handover between different cells of a given cellular network (relying on mobility management functions within the network) or vertical handover between different networks (e.g. an indoor LAN and the outdoor public networks).

As for context-awareness concerns, the UIM service must take into account the capabilities of the terminal and the limitations of the used network service. For example, using the GSM phase 2+ Short Message Service (SMS), the UIM service can only transmit up to 160 characters. Therefore, when using the SMS service, the UIM has to reduce the amount of data transmitted (by either only transmitting certain portions of the original message, or by just signaling the availability of the Instant Message to the user). Future developments of mobile data services (e.g. the introduction of packet switching like the GSM GPRS system or the $3^{rd}$ generation system) will allow users to exploit an even broader range of services. In such a case, the UIM system will have to select the network service with the best quality/price ratio.

UIM systems addressing these two aspects de facto offer users a new type of service. This kind of service—as of this writing—is not part of any available Internet and/or (mobile) telecommunication service operators' offer.

Given that the UIM Service involves information brokerage functionality, the UIM system has been called Instant Message Broker (IMB). The IMB System has been designed to provide a flexible and extensible UIM service that can effectively scale up to a large user community.

For clarity, in order to distinguish between unified instant messaging (UIM) and unified instant messages, the latter are thereinafter referenced as IMails.

The IMB System can either be added to an existing infrastructure or be used as an independent value-added service. Existing infrastructures could be either the ones offered by Internet Service Providers (ISP) or those provided by cellular phone operators. In such a case, the IMB system has to provide well-defined interfaces to external systems (such as the user database or the billing systems), managed by the involved third parties. In the case of a standalone value-added service, offered by an IMB Service Provider, the IMB system uses the same interfaces to its own infrastructure components.

The UIM service—is offered by an IMB Service Provider, which manages an IMB System. The IMB System is the physical realisation of the UIM service. The IMB System is a distributed processing system that integrates network technologies like PSTN, IP, and Mobile Telecom Networks for (i) allowing users to access its functionality, (ii) accomplishing its tasks, and (iii) delivering the processed information to the called parties.

From a business viewpoint, IMB Systems offer services to registered users (thereinafter, the subscribers). Subscription can be provisioned either privately, or through the mediation of an organisation which allows its members to access the IMB service.

FIG. 2 depicts the actors involved in the UIM service (Organisation, Users Community, IMB Service Provider) and the resources required for accomplishing the service's goals (IMB System, PSTN, IP, and Mobile Telecom Networks). The Users Community is the set of IMB service subscribers, which can be further classified either as private users or as organization members. The latter are part of Organisations, i.e. actors that have the authority to establish personal IMB service accounts on behalf of a chosen subset of their members. This delegation schema can also be used to grant IMB service access to the subscriber base of an ISP or network operator.

The primary purpose of instant messaging is the transmission of arbitrary high priority information as a message in (nearly) real-time. Instant messages can be originated and received from various devices such as cell phones (GSM Short Message Service), PDAs (Personal Digital Assistants), e-mail, WWW, facsimile or voice mail. Additionally, instant messages contain functionality for alert generation, message privacy, and payment. A unified instant message can include:
  message data (text and multimedia data)
  actions, for example the generation of an alert notification,
  message privacy (RSA),
  authentication of message originator and content (Keyed-Hashing Message Authentication).
  geographical information, limited message durability The IMB service performs the following steps: (i) receives a message from a subscriber, (ii) transforms message according to the user preferences, and (iii) delivers the transformed information to the recipient's preferred terminal device. The process must take timing constraint into account for ensuring fast and near real-time processing and delivery.

The IMB system (see FIG. 1) consists of four major components all implemented f.e. in Java:
  1. Instant Message Gateway (MG) 4—converts arbitrary messages (GSM/SMS, email, FAX, WWW) into/from IMails;
  2. Message Brokers (MB) 3—manages client address conversion, User Profile handling, IMail routing, security and accounting;
  3. Processing Units 2—provide capabilities for modifying message content;
  4. Subscribers' Information Repositories 1—contains personal information and accounting records.

The IMB system has been developed according to the Open Distributed Processing (ODP) standards. FIG. 3 presents a logical view (the ODP Computational Viewpoint) of the IMB System. In that picture, circles indicate logical computational objects, rounded-angle boxes stand for connection abstractions, and double crossed arcs represent the interfaces between objects.

Subscribers may use different types of frontends for accessing IMB services. As indicated in the picture, one possible frontend is an Internet browser, which forwards the message to a message gateway via a Web server (Web Service). Other frontends might directly communicate with message gateways.

Originating Message Gateways (OMG) receive messages in various forms (GSM/SMS, E-mail, Telefax, etc.) and convert them into IMails. Destination MG (DMG) offer the inverse functionality sending messages directly to the user.

OMG must ensure the authenticity of the IMail. The Web Service based frontend might request the user to perform a login procedure. Other frontends might accomplish user authentication through digital signatures or through other authenticating procedures.

Within the IMB system IMails are transmitted in nearly real-time over secure TCP/IP connections. The MB performs the message brokering tasks. The IMB Profile Database contains information about the currently used terminal and a list of preferred terminals/transmission modes, which can be used alternatively to reach the given subscriber. Depending on the selected transmission method, the MB decides to include additional processing steps, determines the required address information and selects a Destination Message Gateway (DMG). MB is also in charge of some bookkeeping activities like updating the Accounting DB. A DMG finally transmits the IMail to the recipient, according to the addressing information received from the MB. In the case of networks capable of acknowledging message delivery, DMG will transmit this information back to the MB.

The IMB System provides subscribers with several ways of accessing the UIM service. Following are listed alternative frontends:
  1. Web-interface—allows a subscriber using a desktop to directly send an IMail to another subscribers;
  2. Mobile phone—can be used for sending SMS, which are then converted into IMails;
  3. Command-line tool—enabling scripts (e.g. a resource monitoring daemon process) to automatically send event stamps to administration personnel;
  4. E-mail tool—for filtering, redirecting and/or forwarding incoming E-mails as IMails;
  5. Calendar tool—for sending notifications about upcoming appointments or birthdays to the user.

To provide scaleable and dynamically extensible service access, the tools use different types of gateways to access the service. Specialized IMB gateways concentrate on providing a cost-effective interface to a specific network service. Message gateways can be dynamically created and plugged into the system.

The IMB System can optionally use distributed processing units for performing intermediate IMail processing. These units are invoked after the IMB has retrieved the recipient's profile.

The IMail processing step converts one IMail object into another IMail object with the processed content. The processing steps might perform:

1. Message Content Enhancement
  IMB subscribers can force the IMB System to include additional content in incoming IMails. Such additional information (like weather forecast, news headlines, etc.) can be offered to IMB subscribers, following different criteria (e.g. for free, on a subscription basis, on-demand basis).

2. Message Format Transformation
  In this processing step the coding format of the instant message is changed. This might include transcoding from one format to another (e.g. from one image, format to another or from a document format to Postscript). This kind of transformation might be applied if the target terminal can only process a limited number of message formats. Usually the information presented to the User and the media used for presentation remain unchanged.

3. Message Content Reduction
  This process applies when the target device is not capable of handling large messages, or when the perceived network QoS is not sufficient to properly transfer the IMail. Content reduction is lossy, insofar as part of the original information may be lost.

4. Message Interpretation
  The IMB concept can be extended to allow subscribers to include meta-information into their IMails. This meta-information contains commands, which are processed by the IMB System. As example, the "translate :Eng :Ger hunter" command would force the IMB System to dispatch a Language Translation Processing Unit to translate the English word "hunter" into the German word "Jäger".

5. Actions

The commands described in the previous point can be even used to steer specific devices, either at the customer premises or, remotely, in a different location (e.g. one could easily create a plant control systems by using the IMB system as a networking media, gluing sensors, controllers, and actuators). Another example would be the integration of IMB Systems with home automation systems [5].

Message Delivery

IMails are delivered to the recipients through DMGs. As with incoming message gateways, each outgoing gateway is tailored to a specific network technology. When delivering the IMail to the user, the message gateway can perform additional user authentication steps in order to ensure that the target user is securely identified. In some cases, the message gateway must provide additional conversion steps to change the IMail to the format required by the networking service. For example, not all ASCII characters can be transmitted by the GSM SMS service. As aforementioned, some network technologies provide feedback, which indicates that a message was delivered to the end-user's terminal (e.g. the GSM SMS service). That feedback can be sent back to the MB, where it might be logged.

Since MGs are the IMB System interfaces with the real world, they feature a modular architecture, which enables IMB Service Provider to rapidly update their equipment as soon as new telecommunication technologies are made available. This goal is achieved by structuring the MG as a framework, whose core provides common functionality, which accommodate—technology-specific protocol conversion modules (e.g. SMS driver), as a sort of plugins (see FIG. 4).

Message Authentication and Privacy

Message authentication allows the communicating parties to ensure that the sent and received messages (as well as the true and alleged originator) are identical. The IMB system uses the Keyed-Hashing for Message Authentication Code (HMAC) with MD-5 cryptographic hash function. HMAC is described in RFP 2104 and has been chosen for IP security, such as Transport Layer Security (TLS, soon to replace SSL) and Secure Electronic Transaction (SET). In contrast to symmetric block ciphers, cryptographic strong hash functions do not underlie application or export restrictions. Message encryption is not implemented yet. We favorite the public-key cryptography based on the RSA algorithm.

EXAMPLE

To summarize what described so far, FIG. 5 illustrates as an example how the IMB System behaves in response to a subscriber's request (via a web-interface) to deliver a text message as a SMS to the Called Party.

It is the object of the present invention to modify the above-captioned instant messaging approach for an environment with mutable characteristics. Those mutable characteristics can arise from the fact that the subscribers can in fact freely modify their personal user profiles as situations change and/or as they move to different geographical locations.

The above-captioned object is achieved by means of the features of the independent claims. The dependent claims develop further the central idea of the present invention.

According to the present invention therefore a data base for storing and managing user profile data is provided. The user profile data represent sets of user's information, and/or user preferences concerning the terminal devices users have access to, within information transmission network. The data base comprises respectively for each user at least one customisable user profile which can be created, edited and/or deleted by the user. Each customisable user profile is associated with an environment of the user representing a physical location and/or a logical context of the user.

The data base can comprise a plurality of user profiles for one user, wherein only one user profile of a user is active at the same time.

Each subscriber can have a plurality of User Profiles in a so-called User Space, which is the subscriber's own data space, as provisioned within the aforementioned User Profile Database.

User Profiles can be totally independent from one another, or correlated. In the latter case, User Profiles can be considered as nodes of a graph, where the directed arcs represent logical links chaining User Profiles in an ordered manner.

Each directed, open-loop path is hereby defined as a Context.

Specific User Profiles (thereinafter indicated as Front-End Set Profiles, or simply FES) are defined as containing the description of a set of front ends. When FESs are not correlated each other, each Context simply chains one FES and one or more User Profiles.

The User Profile chaining mechanism, can be used for efficiently extending the information conveyed by a pre-existing User Profile (or a chained set thereof), with additional new ones, by following an inheritance scheme.

This inheritance scheme can be eventually extended to include User Profiles not belonging to the sheer given User Space, rather being available to all (or a set of) subscribers. This scheme implements the concept of shared information.

The aforementioned graph is topologically equivalent to a non-loop free tree structure, where the root represents the overall IMB system default configuration.

User Spaces are non-loop free sub-trees of the aforementioned general tree. Within the User Space scope, the sub-tree root coincides with the subscriber's User Profile that contains subscriber's personal information. From this User Profile, all the other chained ones default to. In this case, each tree branch (a loop-free directed path, connecting some nodes of the given sub-tree—not to be confounded with the sub-tree concept) represents a Context projection onto the given User Space.

The aforementioned concepts are hereby described in terms of what described in the MASE Profile patent. More specifically, a User Profile is a Card, a Context is a set of Cards, and the order applied to the Context is the so-called search order.

One or a plurality of presence token for each user can be provided, each presence token representing the availability of a user to receive copies of incoming instant messages at one of the terminal devices configured in the given User Profile.

The User Space is associated with a special User Profile, the so-called Default User Profile, which contains subscriber's personal information and (as an option) service specific information. This User Profile can be created and deleted only by the User Profile Database administrator. Subscribers can only partially modify their own Default User Profile.

The hierarchical scheme of the user profiles can be like a tree, the default user profile being the route of the tree.

A priority information can be associated with each terminal device of a user profile.

The data base can contain information on the access network, the network address and the characteristics of each terminal device.

A mnemonic for the user can be attributed with each terminal device.

A unified name can be attributed with each user.

The data base content can be stored in cards in a distributed fashion.

A user can directly enquire and counting information.

According to a further aspect of the present invention a software program is provided implementing, when loaded in the memory of a computing device in a network environment, a data base according to as set forth above.

According to a still further aspect of the present invention, a method for managing a user profile data base for storing user profile data representing the sets of terminal devices of users in an information transmission network is provided. The data base comprises for each user a set of User Profiles which can be created, edited and/or deleted by the user (with the exception of the Default User Profile, which the subscribers can only partially update), wherein each customisable user profile is associated with an environment of the user representing a physical location and/or a logical context of the user.

The data base can comprise a plurality of user profiles for one user, wherein only one user profile of a user is active at the same time.

According to a still further aspect of the present invention a software program for implementing, when loaded in the memory of a computing device in a network Environment, a method as set forth above is provided.

In order to meet the time constrains of UIM systems, the IMB system has to determine whether the IMB user can be reached online or through other fast transmission means.

Therefore, the IMB System maintains IMB subscribers' information in an IMB User Profile Database. Each IMB subscriber is assigned a User Space, where custom information is organized in a set of User Profiles. This set is thereinafter indicated as Context. The user can define different Contexts for different situations and dynamically switch between them. At any given time, only one of the Contexts contained in the User Space is actually used by the IMB System. Such Context is thereinafter referred to as Active Context. The User Space maintains an Active Context Indicator, defining the currently used Context. At any time, the user can switch to another context (Context Switch). The use of mnemonic names for each User Profile and Context greatly improves the usability aspects of this mechanism.

The currently used Active Context fully describes how the subscriber can be reached. This includes an indication whether the user is currently online on the preferred terminal device and in addition a set of alternative terminal devices, where the given IMB subscriber might be contacted when not being reachable at the preferred one. These alternative terminal devices can be also used for receiving additional copies of instant messages. Besides this information, the user profile contains information about each terminal. The following Context information is used during the message brokering:

1. online—indication whether the user is currently online
2. Preferred terminal device—the terminal where the user is currently working
3. Priority list—indicates the order the IMB System shall follow for selecting terminal devices: high-priority terminal devices are to be selected first. If the selected terminal device is not available at the moment, the IMB System shall select another device with the same or immediately lower priority (fallback mechanism).
4. Presence Tokens—The number of purchased presence tokens, and the number of tokens (out of the purchased one), which the subscriber actually wishes to use at any given time.

For each terminal, the MB can retrieve the following information:
1. network type—specifies through what telecommunication media and/or Service Provider the IMB System can contact the selected terminal device. The network type includes QoS information required to determine the timeliness of information delivery through this network.
   network address—specifies how the IMB System can contact the addressed terminal device through the given network.
2. terminal device characteristics—the IMB System uses this attribute for selecting the proper information format conversion mechanism, which is required for delivering information in a ready-to-use form to the Called Party's preferred terminal device.

For administrative and management purposes, each terminal device listed in a User Profile is associated with a mnemonic (name), which allows humans to easily refer to any terminal device. Moreover, User Spaces contain additional subscribers' custom information, such as public keys (used for message privacy), buddy-lists, usage statistics, etc.

The user can manipulate his profile through different means like a Web-based user interface, SMS, or a client application. This allows to define the currently used devices and to define different profiles for different situations. Anytime the current active context indicator can be switched to another profile.

Further aspects, features and advantages of the present invention will become clear for the man skilled in the art when reading the following detailed description of the present invention taken in conjunction with the figures of the enclosed drawings.

BRIEF DESCRIPTION OF THE DRAWINGS

FIG. 10 shows an enhanced profile structure.

DETAILED DESCRIPTION OF THE PREFERRED EMBODIMENTS

Figure 1:
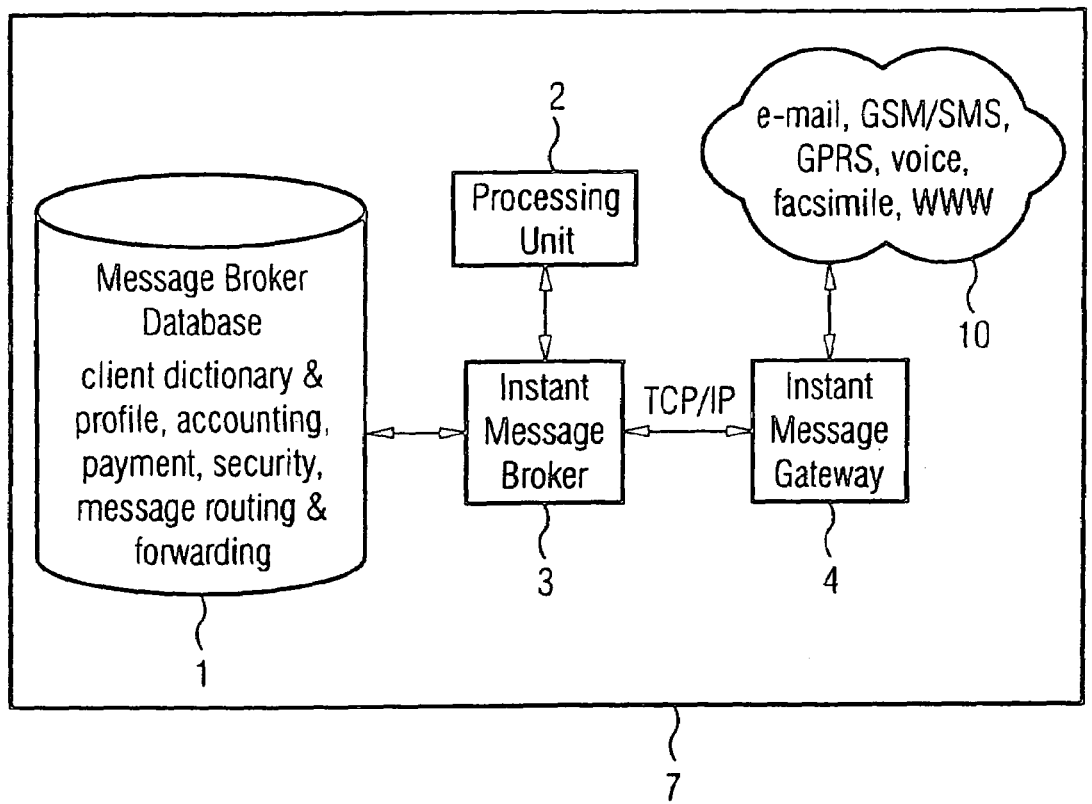
FIG. 1 shows the basic architectural components of a unified instant messaging system.
Figure 2:
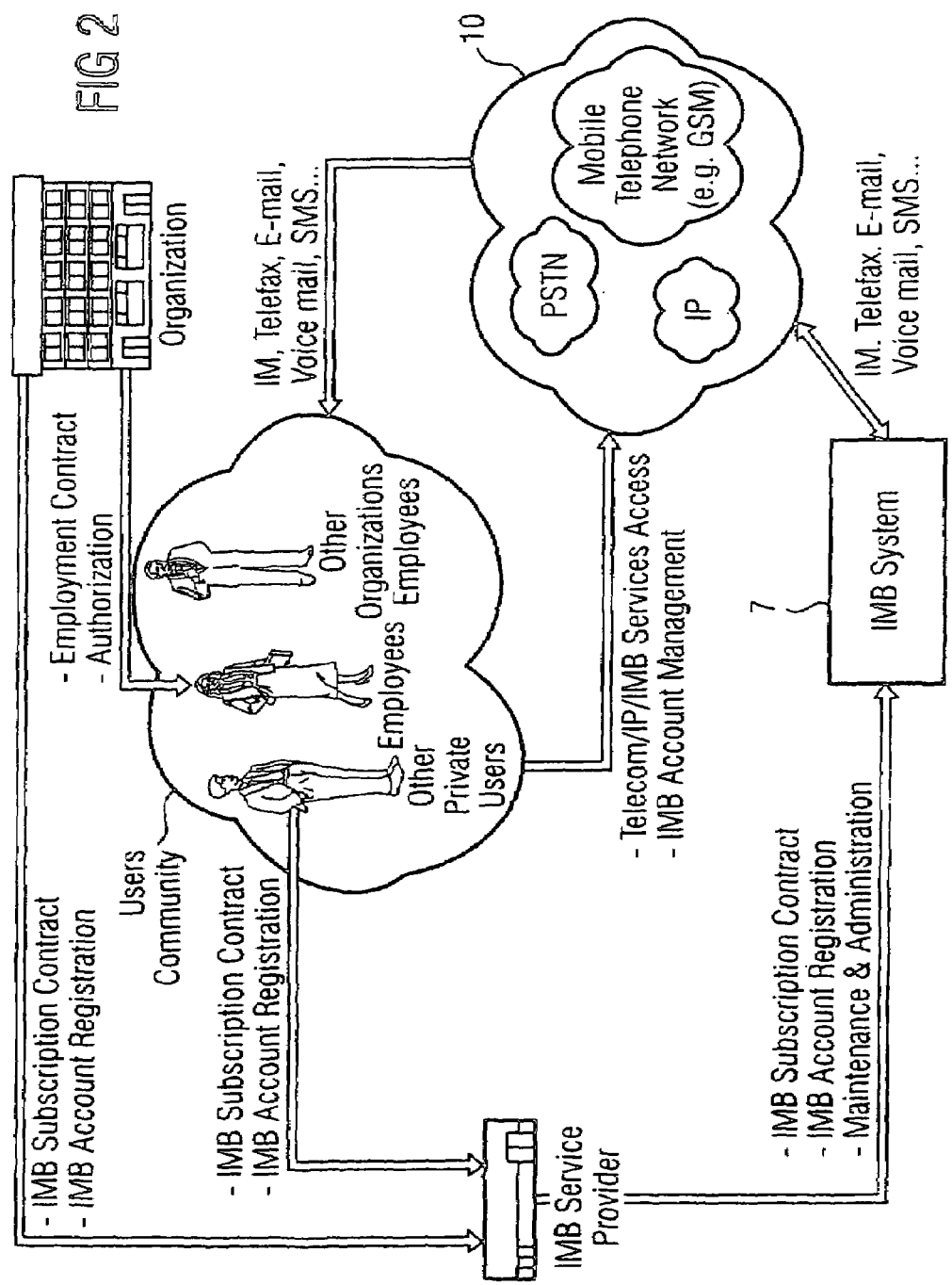
FIG. 2 shows a unified instant messaging surface from a business view point.
Figure 3:
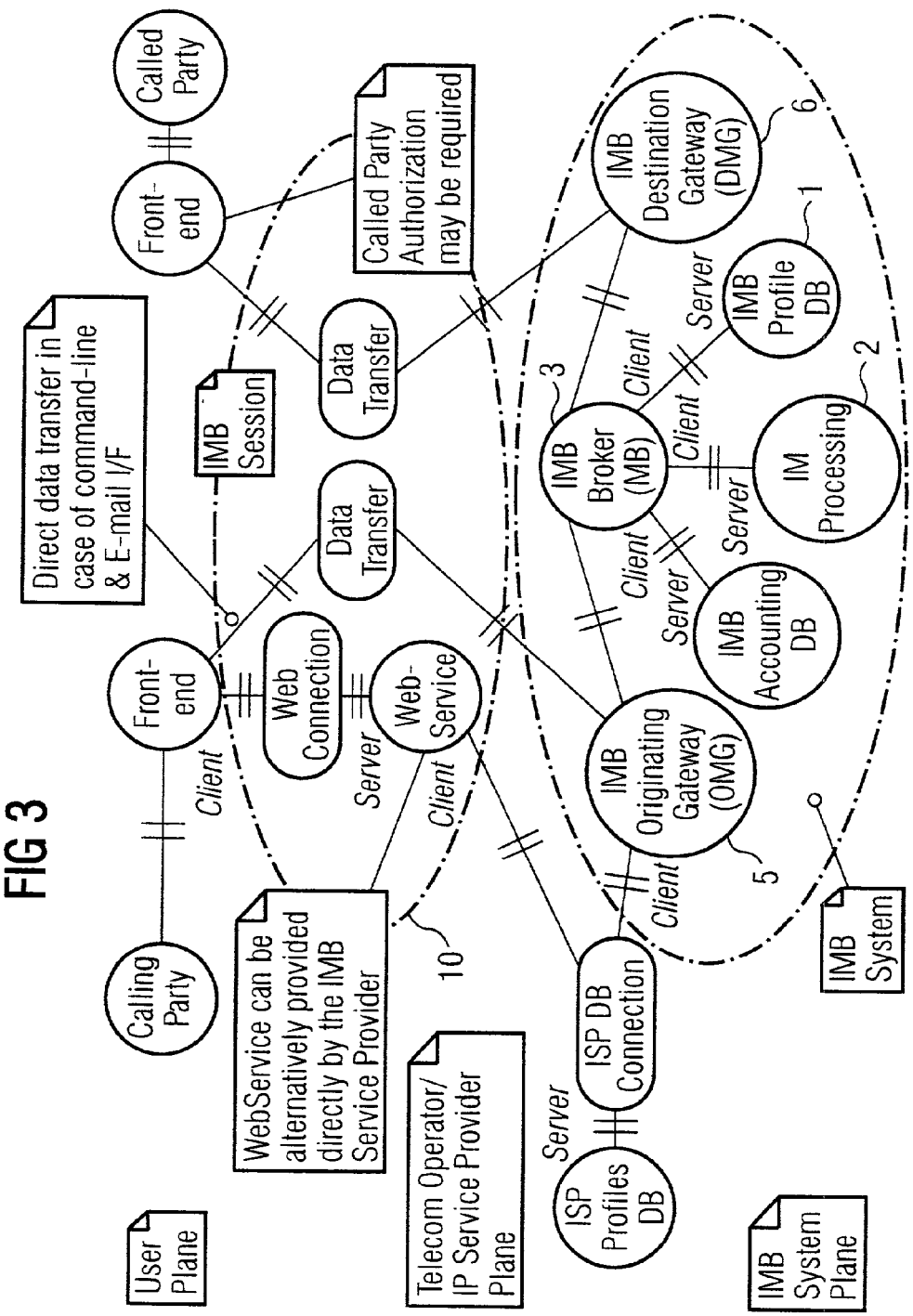
FIG. 3 shows an instant message broker from a computational view point.
Figure 4:
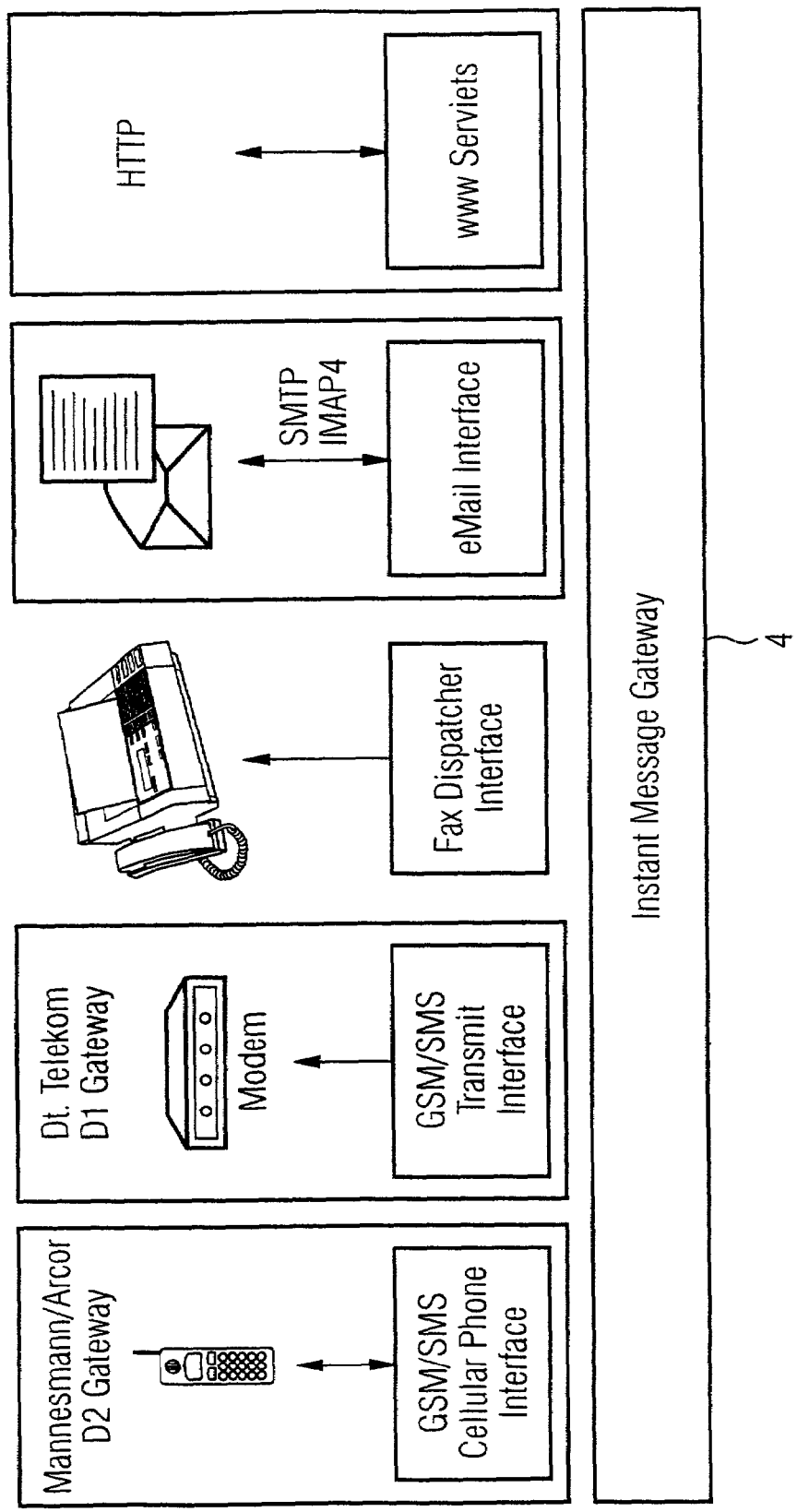
FIG. 4 shows an instant message gateway with protocol interface modules.
Figure 5:
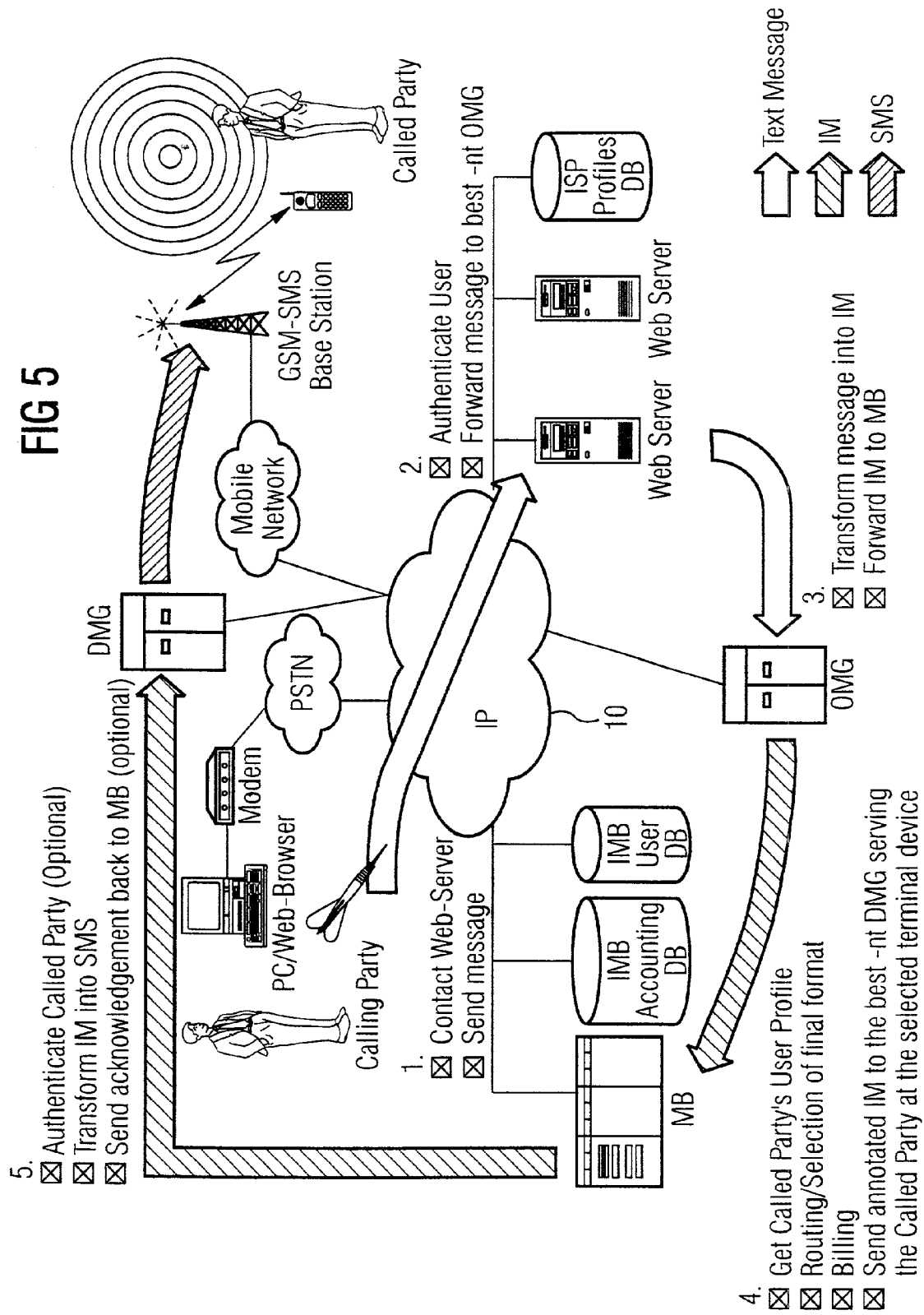
FIG. 5 shows an information flow across the instant message broker system.

| ACTS | Advanced Communications Technologies & Services |
| --- | --- |
| COTS | Commercial Off-The-Shelf |
| EMPP | Enhanced MASE Profile Paradigm |
| FES | Front End Set |
| IM | Instant Message |
| GSM | Global System for Mobile Communication |
| GUI | Graphical User Interface |
| HW | Hardware |
| IMB | Instant Message Broker |
| IN | Intelligent Network |
| IP | Internet Protocol |
| MASE | Mobile Application Support Environment |
| MB | Message Broker |
| MG | Message Gateway |
| NP | Number Portability |
| ODP | Open Distributed Processing |
| OS | Operating System |
| PC | Personal Computer |
| PDA | Personal Data Assistant |
| SMS | Short Message Service |
| SW | Software |
| TINA | Telecommunication Information Network Architecture |
| UI | User Interface |
| UIM | Unified Instant Messaging |
| UML | Unified Modeling Language |
| UN | Unified Name |
| WAP | Wireless Application Protocol |
| WWW | World Wide Web |

This invention generalises the IMB concept by dealing with a mutable environment rather than the static one addressed by the original IMB invention. In a mutable environment the context, in which the user interacts with the IMB system, can change over time.

Environment mutability can originate from two independent causes: (i) the set of terminal devices that IMB service subscribers use for being reachable through such service, may change over time (e.g. users can change mobile telephone Service Provider); (ii) subscribers may travel. In the latter case, subscribers may reach locations where some of their terminal devices are not available at a hand (e.g. a Telefax machine) and/or additional devices may be offered at better quality-price ratio (e.g. Voice-mail devices).

These factors shall therefore been taken into account in the IMB system design phase, by allowing subscribers to change their original User Profile information at any time and in the most convenient way.

Moreover, subscribers may find useful to store certain information configuration for later use. For instance a business man who frequently stays at a certain hotel while visiting a certain location, should be able to instantly change its IMB User Profile information to a pre-stored one, which already takes into account hotel facilities. Subscribers shall be able to perform this selection by simply using a human-comprehensible mnemonic for identifying the custom IMB User Profile.

This feature would alleviate subscribers' usage of IMB services, by avoiding repeating common interactions with the IMB system for changing User profile information.

Additionally, this invention offers a subscriber a fast way of inquiring IMB services accounting information.

Reasons for providing all these features are:
automatic changes: the IMB System can be automatically instructed how to reach the subscribers at their most convenient terminal device (or set of devices), as soon as the mutable environment changes,
this feature is particularly of interest when addressing Mobile Ad-Hoc network issues.
easy changes: IMB subscribers shall be able to interact with the IMB system in an user-friendly way (e.g. the use of custom mnemonics), as for maintenance and administrative purposes.

Both the Intelligent Network and TINA standards focus on similar issues, but they are both limited to the telecommunication world (e.g. IN Call Forwarding and Call Redirection services). Actually, the TINA approach is moving Carriers' focus from sheer telephone services to multimedia ones, but this standardisation effort has not yet gained momentum in the telecommunication marketplace, as of this writing. Furthermore, TINA deals with more complex scenarios compared to the IMB Service, and does not explicitly leverage existing World Wide Web (WWW)-based services, mobile multimedia applications, and hand-held computing devices, wireless connected to the WWW.

Introduction

Figure 6:
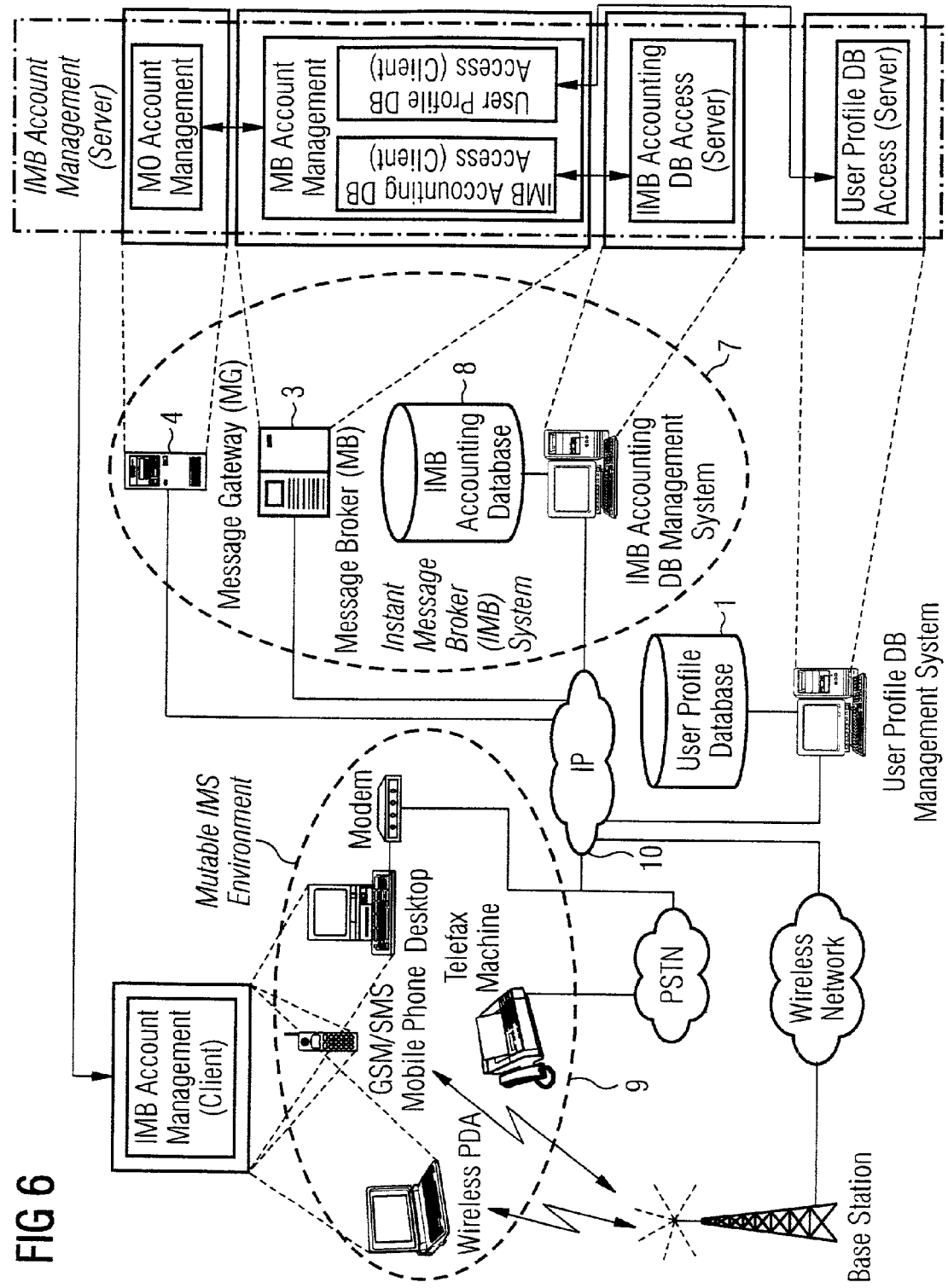
FIG. 6 shows the context and functional decomposition of an instant message broker account management.

The context of a mutable IMB environment is depicted in FIG. 6, where a high level functional decomposition is also presented (by early introducing ODP Engineering Viewpoint concepts, that will be elaborated in later paragraphs).

A suite of SW units is distributed over the set of HW entities that concur to build up the IMB system. These SW units co-operatively perform their tasks, in order to allow IMB subscribers to manage their IMB Profile and Accounting information.

More specifically, these SW units consist of IMB Account Management Client and Server units. The Client unit serves as a front-end for subscribers who wish to access their IMB User Profile and Accounting information. The latter unit contains the IMB Account Management core functionality, and is in turn decomposed into multiple HW units, which are collocated in the IMB Message Gateways (MG), in the IMB Message Brokers (MB), in the IMB User Profile Database, and in the IMB Accounting Database.

Notes about the IMB User Profile Database

Actually, the IMB User Profile Database HW Unit is indicated in FIG. 6 simply as User Profile Database 1, and it is placed outside of the ellipse identifying the IMB System 7. This figure proposes in fact a separation between the User Profile Database 1 and the IMB System 7, insofar as the information managed by such database can conveniently be used by other systems, which might rely on it for providing their services.

The major advantage offered by the standalone User Profile Database approach, is in fact the availability to retrieve the current state of a subscriber at any given time, in terms of which terminal device (and what alternative terminal devices) the subscriber is currently reachable on.

This kind of information can be compared to a dynamic phone directory (white pages), a mechanism that is addressed for instance by IN standardisation bodies for defining the Number Portability service (restricted to the sheer telecom arena).

The IMB System 7 relies upon a Unified Naming convention for uniquely identifying IMB subscribers. By following the aforementioned approach, this topic can be therefore moved out of the sheer IMB System context, to the more general User Profile Database 1.

As in the IN Number Portability case, users can register with the User Profile Database 1 for obtaining a Unified Name (UN), and store there any information that might be necessary whenever subscribing special services, like IMB User Profile information in the case of the IMB service. In such case, Unified Names can be used also for properly accessing the IMB Accounting Database 8.

This invention presents a common database structure that can be effectively used for storing, general context-aware information in the User Profile Database 1, whereas Unified Naming issues are described in more detail later on.

The Method

This paragraph introduces the hereby-proposed method from a logical perspective, by describing:
- the logical data structure model (described at the ODP Information Viewpoint level);
- the logical operations that can be used to manipulate such data (described at the ODP Computational Viewpoint level).

FIG. 6 represents both the context of a mutable IMB environment and a high level functional decomposition, where the major aforementioned SW Units are indicated as placed in IMB System HW Units and in the User Profile Database and Database Management System HW Units.

Figure 7:
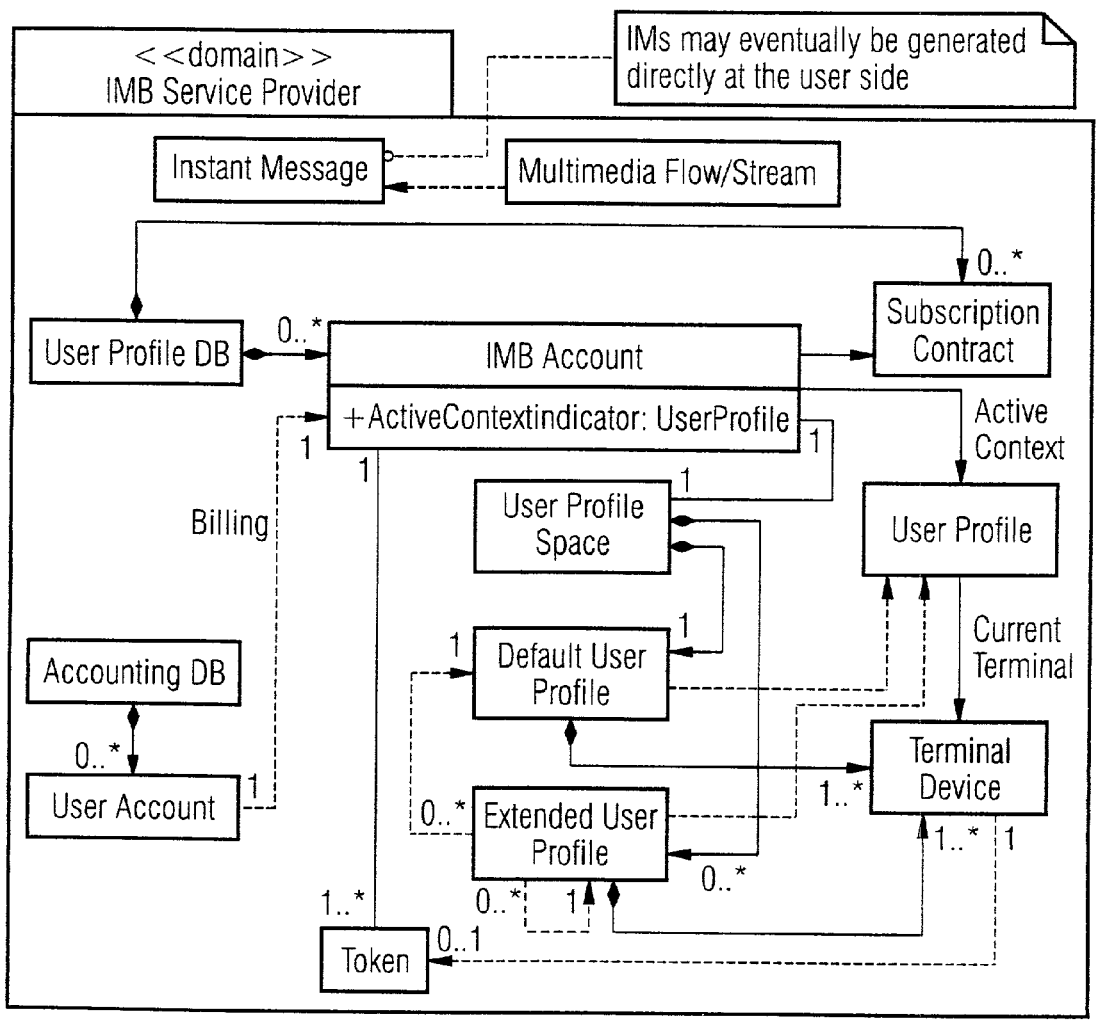
FIG. 7 shows details of the instant message broker data bases from an information view point.

FIG. 7 offers a detail of the IMB System ODP Information Viewpoint, with respect to the IMB Databases. The graphical notation used is the UML. This figure graphically summarises at a high level the data structure as described.

Figure 8:
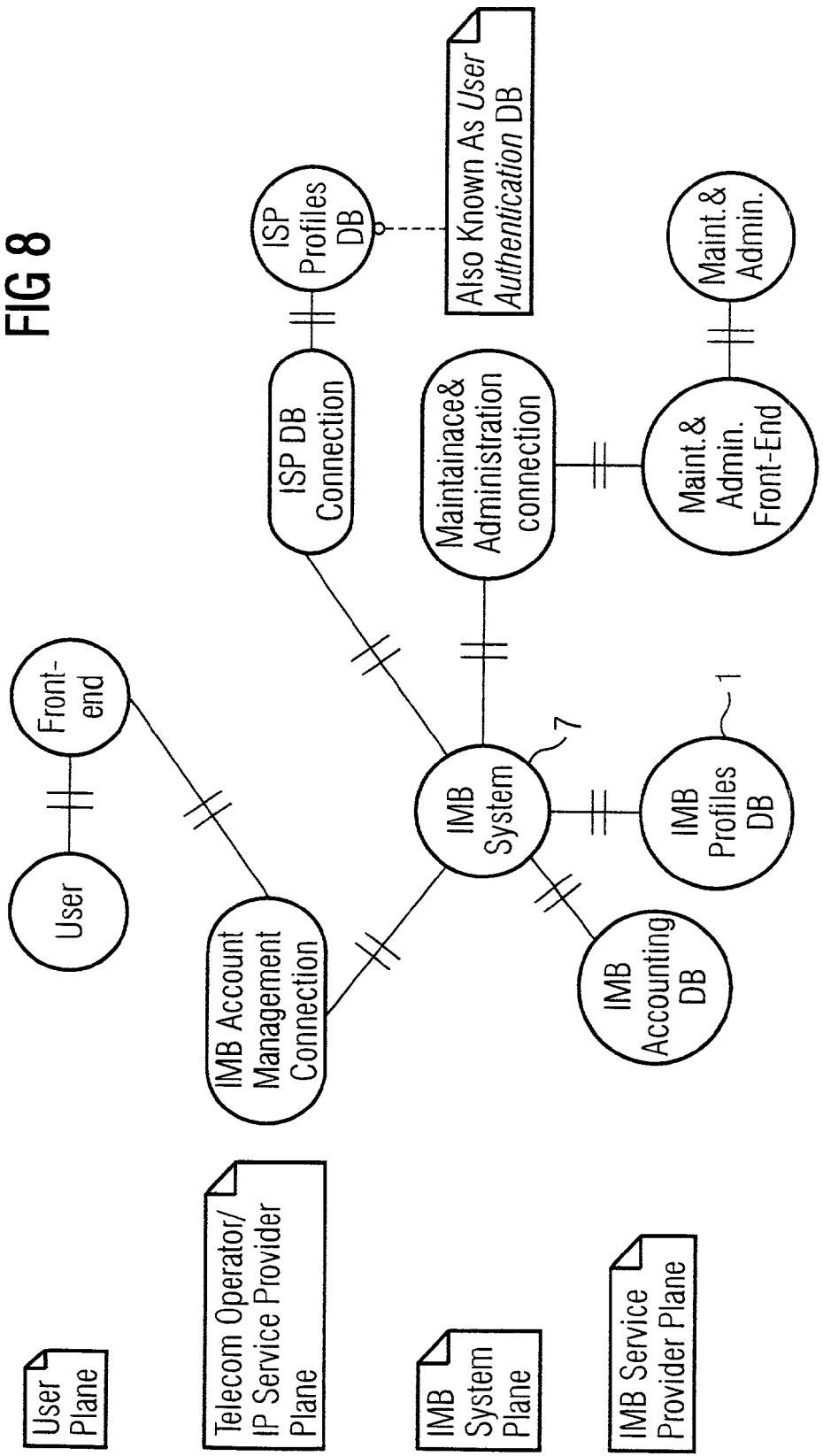
FIG. 8 shows a global view of the instant message broker account management functionality from a computational view point.

FIG. 8 offers an ODP Computational Viewpoint of the overall IMB System, where circles indicate logical computational objects, rounded-angle boxes stand for connection abstractions, and double crossed arcs represent the interfaces among the various objects. The front-end functionality can accommodate both the IMB Service Access and the IMB Account Management Client Unit.

In this figure, the ISP Profiles DB and ISP DB Connection bubbles indicate a possible case where the IMB System can verify IMB subscribers' identities by simply relying on a third party's DB (an Internet Service Provider, in the case shown). There can be several other possibilities for achieving the same purpose (i.e. accessing subscriber authentication information), e.g. by using a GSM Operator DB, or an IMB Service Provider own DB (which can coincide with the IMB Accounting DB).

Figure 9:
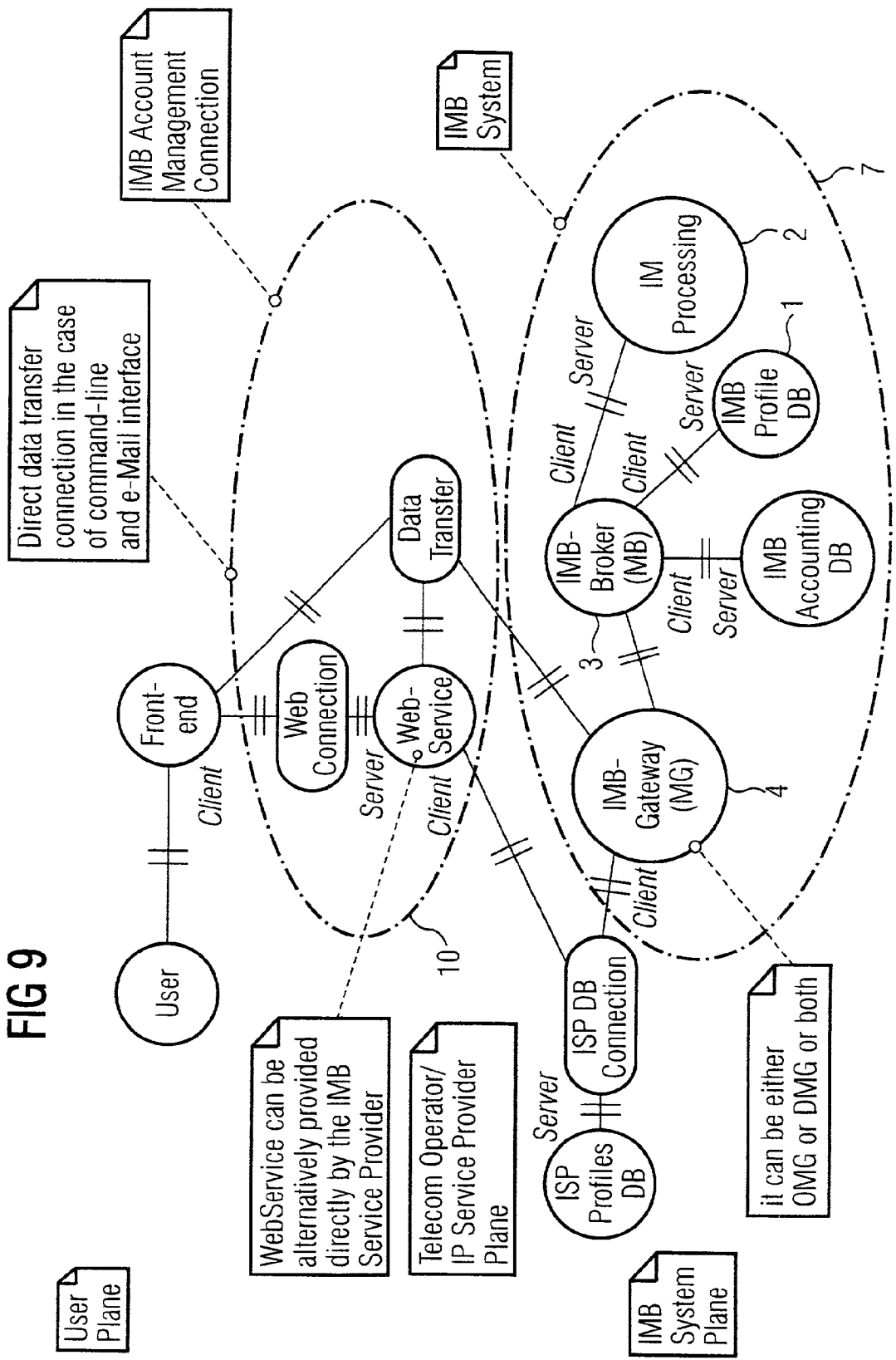
FIG. 9 shows details of the instant message broker system from a computational view point.

With respect to the UML Class Diagram presented in FIG. 7 and the Computational Viewpoint diagrams depicted in FIG. 8 and in FIG. 9, the proposed method offers the following, features:

1. It provides IMB subscribers with an IMB Service User Space:
   - an IMB Service User Space groups the Default User Profile (originally created at subscription time) with zero or many Extended User Profiles;
   - Extended User Profiles are stored, pre-configured User Profiles that can be used in substitution of—and/or in integration with the Default one;
   - the Default User Profile can be changed, queried, but not deleted, whereas the Extended User Profiles can be created, changed, queried, and deleted:
     - as aforementioned, Default User Profile is created only once at subscription time by the IMB Service Provider;
     - similarly, only the IMB Service provider can accomplish Default User Profile deletion. When this happens, actually the whole given subscriber's User Space is de facto deleted;
     - this invention therefore addresses these issues by introducing different levels of authorisation in the IMB Account Management functionality;
   - for efficiency purposes, Extended User Profiles can always default (if necessary) to Default User Profile information and shared User Profile information (thus avoiding information replication);
   - such hierarchical scheme can be further extended recursively, thus leading to the conclusion that the IMB Service User Space is topologically equivalent to a non-loop free directed graph. Within a User Space scope, such a graph assumes a non-loop free tree topology, where the root node coincides with the Default User Profile.

2. It offers the concept of Active Context: at any given time, only one of the User Contexts is effectively used by the IMB system; all the others can be considered as being in a stand-by state:
   - subscribers can switch at run time from one Active Context to another one (Context Switch). This operation is accomplished by simply updating an Active Context Indicator, which is part of the User Space and maintains a reference to the Context currently used as Active Context;
   - any change to the Active Context (including Context Switch) takes place in mutual exclusion with respect to the normal MB routing activity. Changes to any other stand-by profile can be performed concurrently with respect to the normal MB routing activity.

3. It allows IMB subscribers to directly inquire MB User Profile and Accounting information
   - inquiry results are sent to the subscriber by using plain IMB functionality (e.g. Accounting information can be sent to the inquirer as a SMS message, if so preferred by the subscriber, according to his/her User Profile).

4. It allows IMB subscribers to update IMB User Profile information.
   - updates can be committed back to the User Profile being changed, or to a fresh new one:
     - new (Extended) User Profiles can be created by simply storing only the new information, (which can result brand new to the IMB system, and/or may override pre-existent one): for this reason, new Extended User Profiles logically refer to previous information. This reference scheme is offered by the aforementioned logical directed graph structure of the IMB User Space. This to underline that no information cloning mechanism is used whatsoever.

5. It allows subscribers to signal their availability at a certain terminal device, out of the set of terminal devices configured in the Active Context.
   - subscribers' availability at one or more terminal devices is bound to the concept of presence token, which the IMB system uses for selecting the proper terminal device where to route messages;
   - in the (normal) case of a multiplicity-one token, there is only one presence token, which the user can logically move from one device to another;
   - in the case of a multiplicity-n token, the subscriber can freely and independently signal his/her availability at multiple terminal devices, up to a maximum number equal to n. The multiplicity greater-than-one service is envisioned to be an optional feature that subscribers can obtain at an additional charge.

6. Subscribers can accomplish all the aforementioned management operations by using a front-end device. This entity provides a secure connection to the IMB System, which is in charge of:

6.1 verifying subscriber authentication (through either the mediation of a Web Server or directly the Message Gateway functionality);

6.2 determining subscriber authorisation level (e.g. through the Message Broker functionality, based on the information contained in the User Profile and/or Accounting Database);

6.3 fulfilling subscriber requests and communicating back the results to the subscriber (e.g. through the Message Broker functionality, based on the information contained in the User Profile and/or Accounting Database).

As will described in more detail in the following paragraphs, such functionality is broken into multiple SW units.

The Implementation of the Method

The following paragraphs describe the mapping from the logical model (ODP Information and Computational Viewpoints) to the implementation of it (ODP Engineering and Technology Viewpoints.

First of all, the logical data structure presented in the previous paragraph is mapped to an extended version of the Profile concept.

Following is the description of the physical realisation of the aforementioned ODP Computational Viewpoint model, in terms of SW and HW units, with respect to the original IMB system architecture.

The Unified Naming Convention

Given that IMB service subscriber and, more generally, User Profile Database entries shall be uniquely identified somehow with a logical name, this invention proposes what follows:

1. User Profile Database entries are uniquely identified by a Unified Name (UN), that is an E-mail address type-primary key;

for instance, a businessman can have an UN (e.g. john-d-smith-123@imb.sony.de), which is worldwide unique: the businessman can be reached on any of the terminal devices listed in his IMB User Profile, by simply posting Instant Messages to the aforementioned UN;

2. User Profile Database entries are identified by users' personal information such as first, middle, and last name, date of birth, place of birth, home address, and the like. This information acts as secondary keys, whereas the UN acts as a primary key. Combinations of these properties (thereinafter, the properties) can thus be used for retrieving users' UNs upon third parties' demand;

3. the UNs are to be assigned by the authority that manages the Use Profile Database. In the simplest case the User Profile Database is actually owned by the IMB Service Provider itself;

4. the IMB Service subscribers can use either their UN and/or individual/group aliases for being reachable via the IMB System. The UNs and the aliases (both implemented as strings of characters, but with the latter not bound to any specific schema) de facto hide the address of the current terminal device where the subscriber can be reached, thus abstracting out the technology used for delivering IMB Services;

5. as an IMB System specific feature, User Profiles themselves can be assigned logical names (aliases), in order to improve the overall system usability, as perceived by subscribers.

The User Profile Database Structure

The Default and the Extended User Profiles are implemented as sets of properties (cards), where each property key uniquely identifies a given property, and the property value corresponds to the given property content.

Keys namespace depends on the card name, and eventually can include intra-set keys taxonomy (e.g.<a-fully-qualified-card-name>.terminal.speed would uniquely identify—within a given User Profile Database—a certain card containing, among others, the speed sub-property of the terminal property).

These sets can be logically identified by names, which make use of the MASE Profile naming convention: names are a concatenation of (in order of appearance) User Name, Terminal Name, Network Name, Application Name, and Situation Name.

In addition, a sixth name is hereby introduced, the Location Name, in order to convey information as to where the user is currently reachable. The location truly represents a physical location (e.g. a city, a hotel or an airport), whereas the situation represents a context (e.g. "home" Vs. "work"). The so modified MASE Profile paradigm is thereinafter indicated as Enhanced MASE Profile Paradigm, and abbreviated as EMPP.

FIG. 10 depicts how cards are actually organised in EMPP: the information is not stored in Default and Extended User Profile data structures, as originally proposed in the aforementioned logical data model. Rather, the Database content is stored in cards, which are logically grouped in a number of different ways.

First of all cards can be organised in Card Types. A Card Type represents a set of default values that other cards can rely upon. Each Card Type maps uniquely to one of the aforementioned card name components. Cards within a Card Type can be logically organised in tree structures.

For example, a pure terminal card (i.e. a card belonging to the Card Type Terminal) contains all the key/value pairs describing, a given terminal device: other cards can use such values for defaulting to any terminal specific property.

By logically combining pure terminal cards (which altogether can be grouped in a T1 set, where the suffix indicates the number of card name components that are specified—in this case just one), one gets a new set of card, T2.

T2 elements contain new and/or overriding information, which builds upon the T1 set elements. As stated above, T2 elements are logical combinations, and it is up to the Database Management System to properly enforce that T2 content defaults to the content of those T1 elements identified by the given card name.

For example, a T2 element containing a (User, Terminal) combination, specifies custom information about the terminal device to use, whereas user's and terminal specific information can be defaulted to the T1 elements containing respectively user's and terminal information.

This process can be recursively iterated, until all the card names components are specified. Each step in the recursion identifies a set ranging from T0 to T6, where T0 represents the global system defaults (the default information describing the yet-to-be-configured system) and T6 represents the most specific information customisation.

The concept of default information is thus implemented in a distributed fashion, by observing that:
1. certain information is exclusively managed by a specific actor (i.e. the user or the system administrator);
2. certain information is pertinent to a specific aspect of the service (i.e. the application used, or the context)
3. this basic information can be further refined in intermediate defaults (T2, T3, T4, T5 sets);
4. each actor may decide to customise information across the different defaults available (i.e. the T0 set and all the intermediate ones).

Figure 11B:
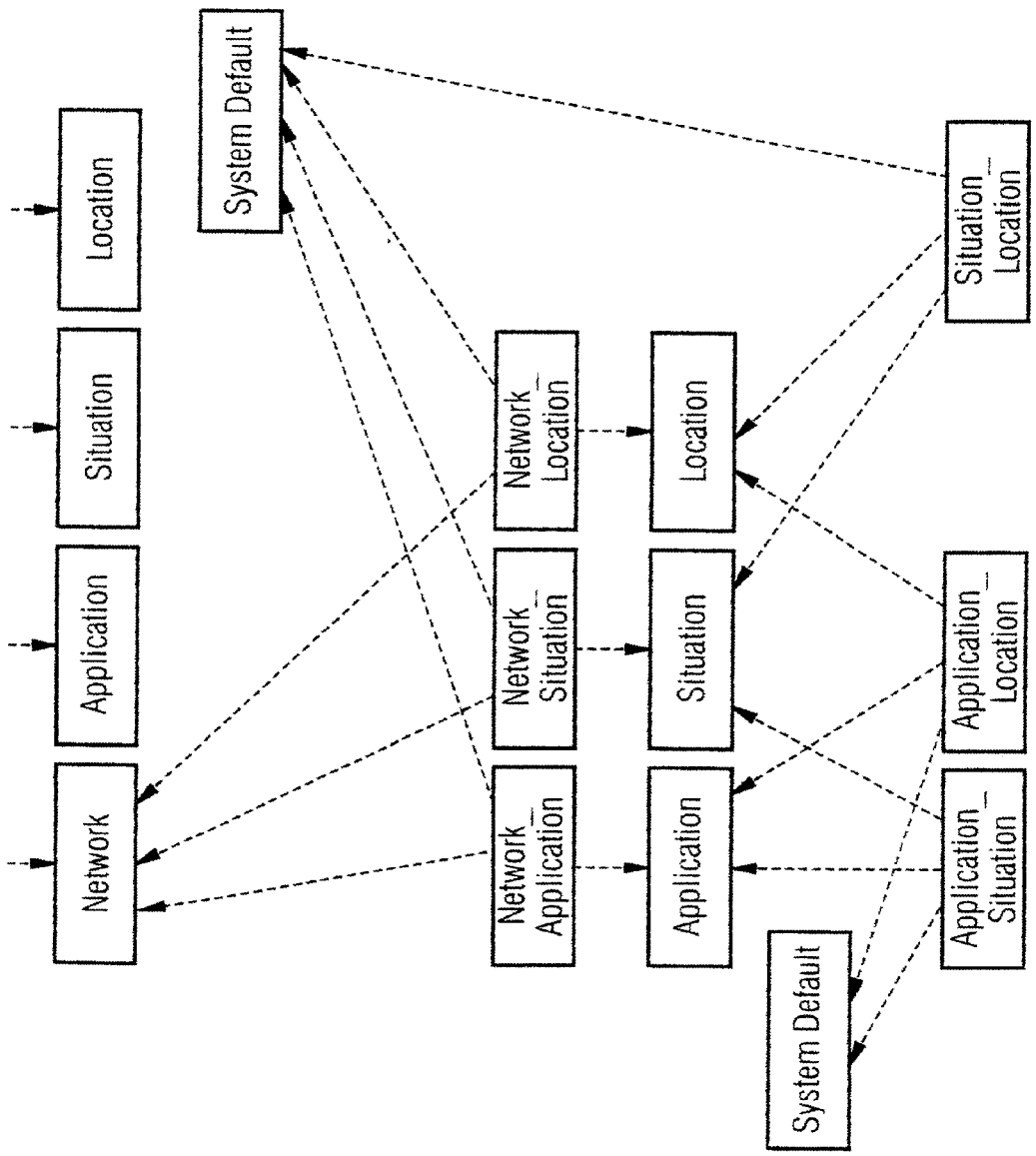
FIG. 11 shows an incomplete example of the data model (UML Class Diagram)

This data model is very flexible, insofar as it is designed to address very complex scenarios, like distributing information over multiple networked HW units. On the other hand, this model is quite complex (see FIG. 11), given that the number of elements in each of the Tx sets can be quite high (e.g. the T3 set features up to 20 combinations of card component names). However it is not mandated the use of all the possible Tx cards, and therefore it is up to the user and/or the system administrator to create as many tables as they may deem necessary.

Implementing the IMB User Profile Database with the Enhanced MASE Profile Paradigm This paragraph finally explains how to map the data model represented in FIG. 7 to the EMPP. The mapping is illustrated in FIG. 12.

The IMB Account User Space and IMB User Space can collapse together and be mapped to the T1 element with only the card component name User specified. In this card, among user's personal information, the Active Context Indicator can be implemented as a couple of key/value pairs: Current Location Indicator, and Current Situation Indicator. Either or both of them can be used to select the T2 element which specifies the current Active Context.

Figure 12:
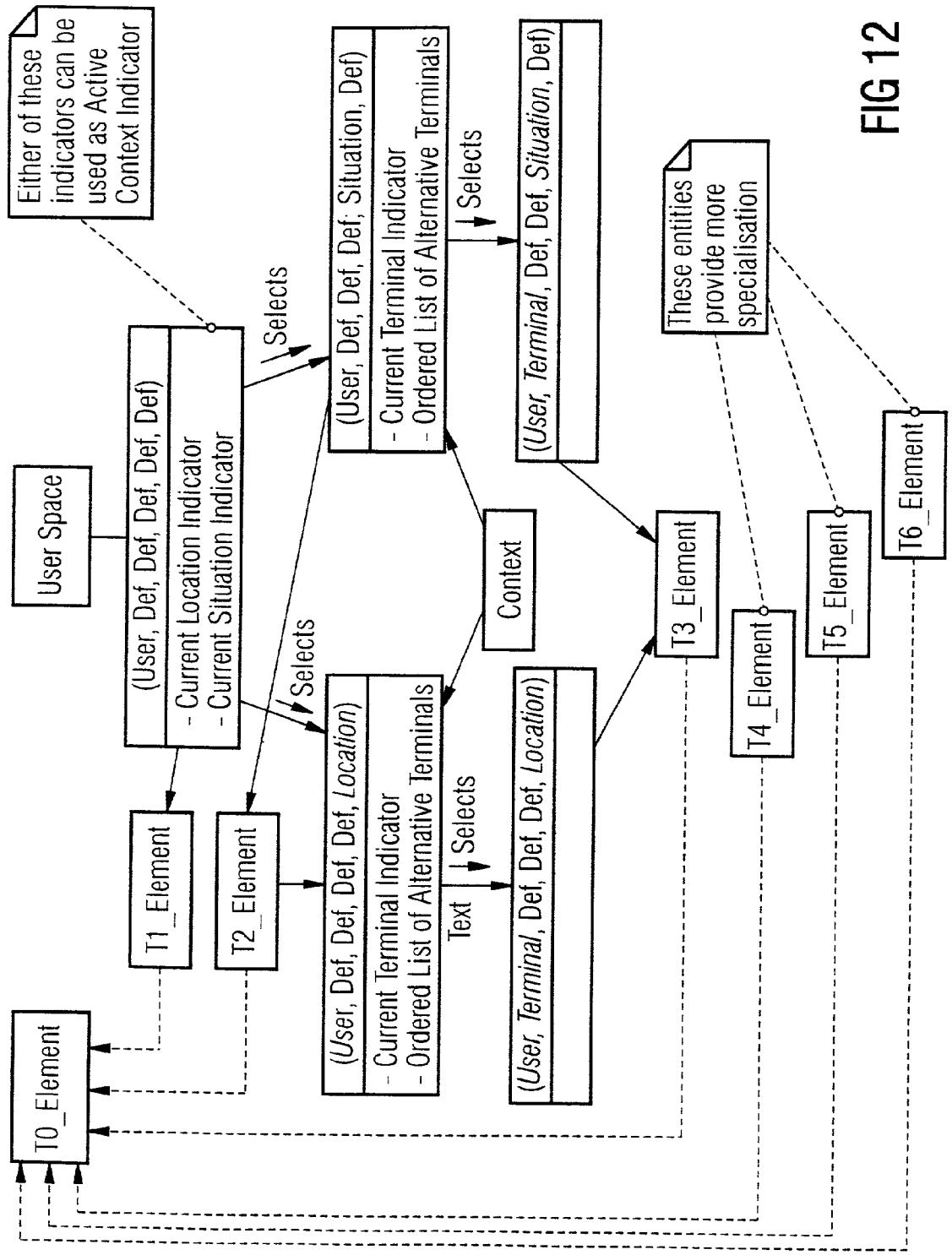
FIG. 12 shows the mapping of the reference data model to the EMPP.

The current Active Context deeply depends on both these concepts (as shown in FIG. 12 with a multiple inheritance association among the Context (a logical representation of the physical and/or logical environment) and the T2 elements User-Location and User-Situation) because of the following reasons:
  the context may depend solely on the physical location, insofar as local authorities and/or organisations can customise IMB services. For instance, a hotel can provide its customers—who happen to be IMB service subscribers—with a set of terminal devices, where the customers can be reached in a more convenient and fast way—compared to the default set of terminal devices;
  the context may depend solely on the situation, which a subscriber happens to be in. For instance, the subscriber may be working on a meeting, on vacation, or performing some free-time activity. In either case, the situation may cause the IMB system to deliver its service in to different set of terminal devices and with different policies (like deliver immediately or later);
  the context may depend on the combination of situation and location: a business meeting in a certain hotel, a business trip in a car, etc. Location-based contexts may imply situation-based contexts, and vice versa.

Once the context has been selected (by identifying the User-Location and/or User-Situation cards), the IMB subscriber can select the current terminal device where she/he would like to be reached with the highest priority. This is accomplished by using a key/value pair, the Current Terminal Indicator, which is contained in both the User-Location and User-Situation cards. Alternative available terminal devices are also listed in such cards: this list is used by the IMB MB for selecting alternative terminals where dispatch Instant Messages to. If the token multiplicity n is greater than one, the IMB can select the first n elements in such a list and send copies of incoming Instant Messages to all the corresponding terminal devices.

Finally more customised information can retrieved, by using the T4, T5, and T6.

As a key feature, the EMPP allows users to implement their preferred search order, beyond the default one.

As an optional feature in addition to the above mechanism, the EMPP also allows the enrich properties, by adding a specific resolution rule (attribute resolution rule) to each of them. This approach can be used for refining the search process across the overall set of EMPP cards, by specifying how default information can be overridden. Basically, the key/value pairs are augmented with a new parameter, which indicates the rule to apply (thus leading to a logical key/rule/value triple). Such rules are as follows:
  Lock: the first occurrence of the given property found along a search run, is to be considered final, and the search process can be terminated.
    Depending on the search order, this rule may lead to different results:
      as a typical case, if the search order examines first the most general occurrence of a property (e.g. from a T0 to a T6 element), this will take precedence over any other more specific occurrence of the given property, which can be found afterwards along a search run;
      as an exceptional case, if the search order examines first the most specific occurrence of a property (e.g. from a T6 to a T0 element), this rule will produce the same results as the Override one (see below);
  Override: the most specific occurrence of the given property, is to be considered final, and the search process can be terminated;
  Append: the union of the contents of all the occurrences of a given property, as found along a search run, is to be considered final. This rule makes sense only for certain type of properties (e.g. character strings).

The information about the resolution rule is actually linked to the property key, and is unique across the whole database. By changing rule, one basically creates a new property type, even if the key is the same.

The overall EMPP can be implemented e.g. as a relational data base (see table I).

Figure 13:
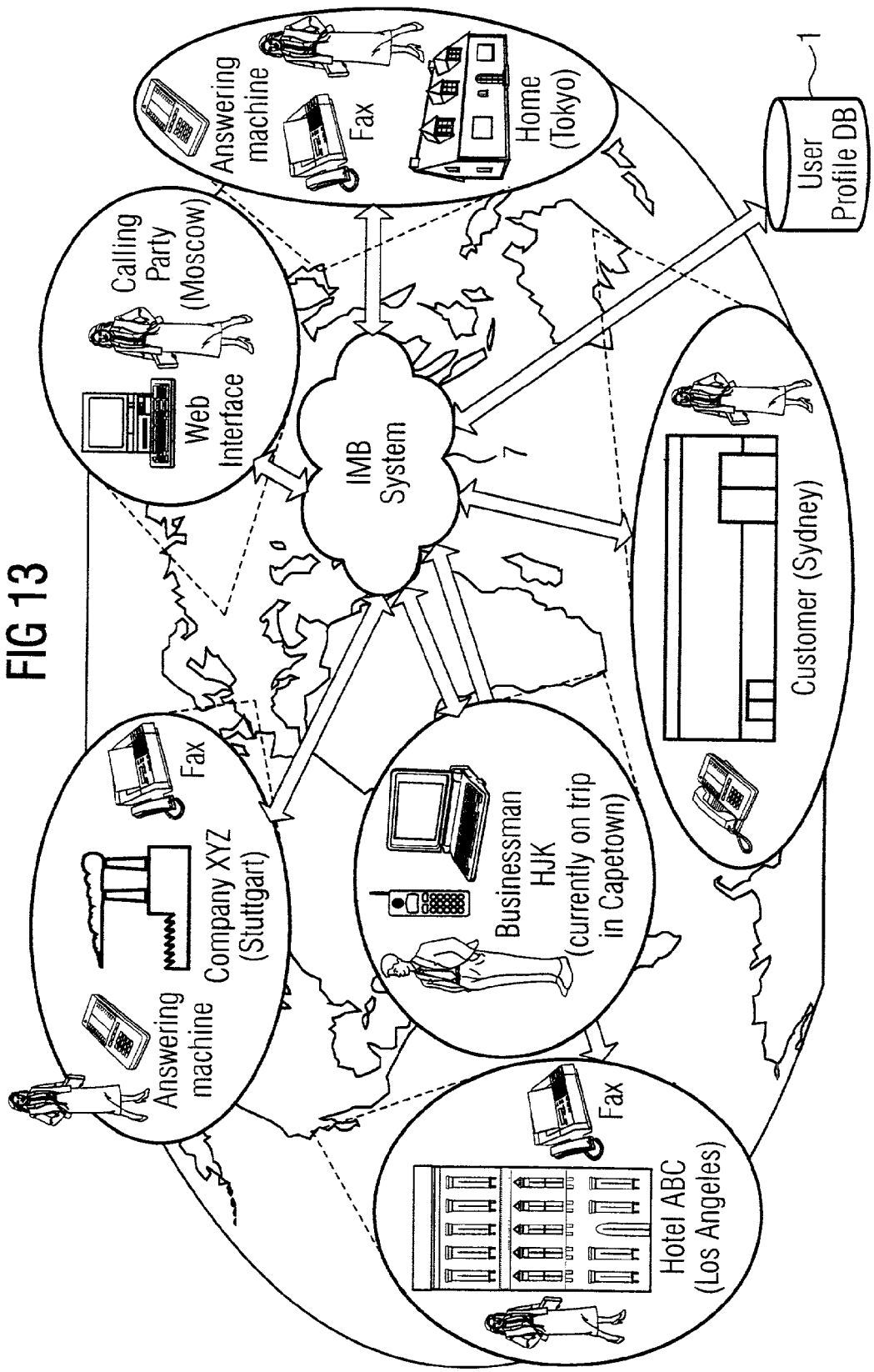
FIG. 13 shows an example of an instant message broker mutable environment.

FIG. 13 exemplifies the IMB Service usage by highlighting the mutable characteristic of the typical IMB environment.

The Units

The IMB Account Management functionality can be broken down into a set of co-operating SW Units, which can be distributed over multiple processes. These processes can be finally distributed over multiple HW Units (see FIG. 6). At this extent, it may be advantageous the use of the MASE component architecture. This approach is based on ODP Engineering Viewpoint concept.

The following paragraphs describe each of these SW Units in more detail.

The IMB Account Management Client Unit

Subscribers can access their IMB Accounting information (with read-only permission) and their IMB User Profiles (with read-write permission), by using an IMB Account Management Client Unit.

The counterpart of this Client Unit, the IMB Account Management Server Unit, will be examined in the next paragraphs, broken down into several SW Units.

This Client Unit can be located either directly on the terminal device the subscriber is currently using, or on a specific terminal device (e.g. a third-party's PC, in the case the subscriber had access only to dumb terminal devices like a Telefax machine).

This Client Unit establishes a secure and authenticated connection with a MG (either directly, or e.g. through the mediation of a Web Server), forwards subscriber's requests to the MG, and finally presents results to subscriber, as soon as the MG responds back to the request.

Finally, this Client Unit manages a logout procedure, either upon user's explicit request, or implicitly after expiration of a keep-alive timer. The keep-alive timer is re-set every time the user sends requests to the MG.

This unit provides subscribers with a UI for browsing IMB User Profile and Accounting information. This UI can be a standalone SW Unit (which the subscriber obtains at subscription time from the IMB Service provider, and installs on his/her PC/laptop/PDA), or can be accessed through the support of an IMB Web Server, by using a COTS web browser. Alternative UI implementations can be:

GUI

Web Interface (e.g. by using Java Servlet technology)

SMS

WAP

Phone

Command-line (scripts)

Etc.

In certain cases, where a terminal device does not offer a convenient and usable GUI solution, the Client Unit offers a limited set of its functionality. For example, a subscriber can use a GSM/SMS mobile phone for a limited set of functionality, like signalling online indication, downloading the list of IMB User Profiles Names (aliases or card names) from his/her IMB User Space, performing a context switch, or simply querying IBM Accounting information.

Moreover, such limited set of operations may even be requested by using many alternative technologies (e.g. speech recognition).

Therefore this Client Unit functionality varies depending on the characteristics of the terminal devices used by the subscribers.

The IMB Account Management Server Unit

This Server Unit provides the functionality complementary to the IMB Account Management Client Unit.

This Server Unit, which de facto implements the hereby proposed Method, is a logical unit, insofar as it is further decomposed in a set of SW units that are distributed over multiple IMB building blocks. These SW units co-operate in order to provide the desired IMB Account Management Server Unit functionality.

Message Gateway Account Management Server Unit

Figure 14:
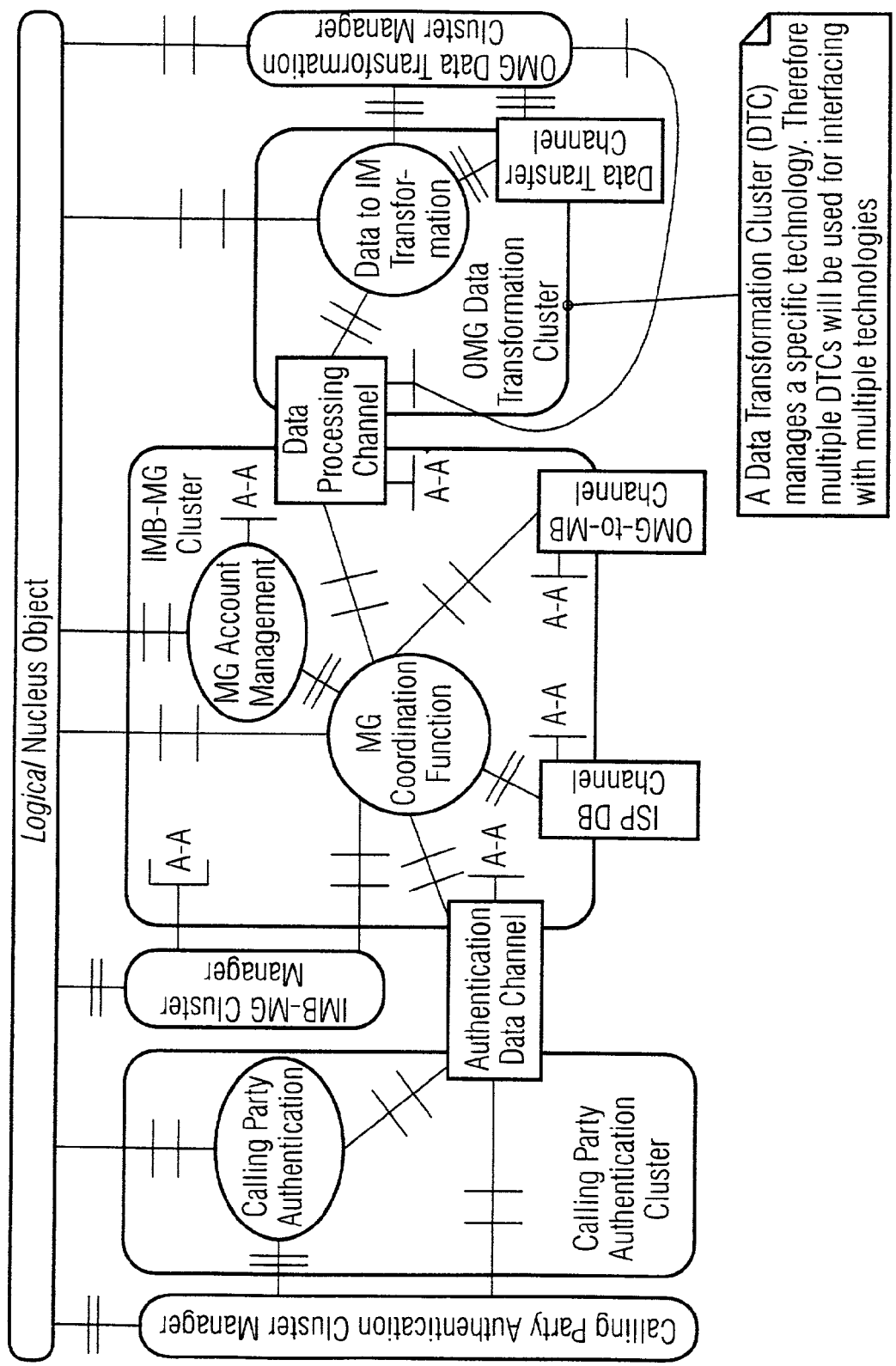
FIG. 14 shows details of the core message gateway system from an engineering view point.

FIG. 14 offers an ODP Engineering Viewpoint of the Message Gateway. Following the ODP graphical notation and terminology, circles indicate physical basic engineering objects (i.e. the SW sub-Units, which the System is composed of). Rounded-angle boxes represent clusters (i.e. a set of closely related basic engineering objects grouped into a single memory address space). The grey-coloured rectangles represent physical channels, which abstract inter-cluster communications. These communications may span SW processes (through IPC mechanisms provided by the underlying OS) or HW devices (through networking). The Nucleus represents, in ODP terminology, the underlying OS. Double stroked arcs represent the interfaces among the various objects.

At this level, no physical distribution of clusters among SW memory address spaces (also known as processes or, in ODP terminology, capsules) and HW Units (in ODP terminology also known as nodes) is hereby presented, since the IMB architecture is quite modular.

The figure actually represents an Originating MG (i.e. a MG configured to only process incoming requests to generate IMs). However, the core MG does not depend on the MG configuration.

The MG Account Management functionality is located exactly in the core MG. The MG Account Management functionality models the MG IMB Account Management Server Unit.

This unit resides in the IMB MG (see FIG. 14), and deals with (i) secure connection establishment with the subscriber, (ii) subscriber's identity authentication, (iii) keep-alive timer management, and (iv) message relay from the subscriber to the IMB MB, and vice versa. A web server can alternatively offer the first three functions.

The MG communicates through secure IP connections with the MB Account Management Unit.

Message Broker Account Management Unit

Figure 15:
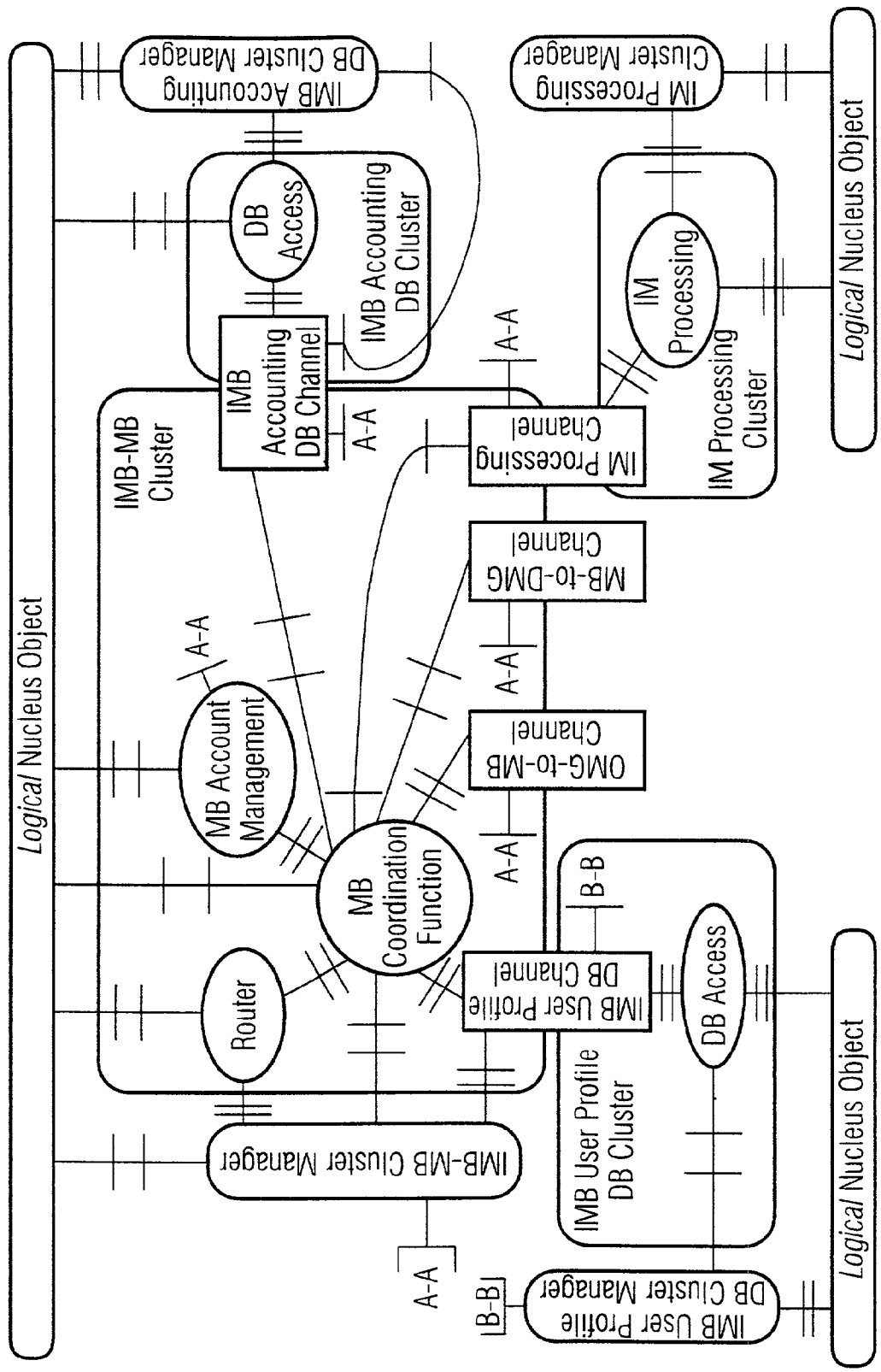
FIG. 15 shows details of the message broker core from an engineering view point.

FIG. 15 offers an ODP Engineering Viewpoint of the Message Broker and the IMB Databases. The MB Coordination Function contains both the User Profile and IMB Accounting Database Access Client Units; the User Profile DB and IMB Accounting DB channels model respectively the channels between User Profile Database Access Client and Server Units, and between IMB Accounting Database Access Client and Server Units. The DB Access Engineering Object that is present in both the User Profile DB and the IMB Accounting clusters, accounts for COTS DB Management System-specific functionality, implementing the core of (respectively) the User Profile Database Access Server Unit and the IMB Accounting Database Access Server Unit.

This figure also depicts the IM Processing entity, which is in charge of special IM processing functionality.

The MB architecture allows the designer to choose among many alternative implementations, depending on the requirements for the specific solution. It might in fact be useful to collocate the MB and the databases on the same node, or distribute them on multiple nodes, depending on administrative, cost, or performance factors that may vary from implementation to implementation.

This SW Unit is located in the IMB MB (see FIG. 15), and maps subscribers' IMB Account Management operations to User Profile Database query update, creation, and deletion operations. The latter two operations are allowed only to authorised personnel: therefore, the MB Account Management Unit always verifies subscribers' authorisation level, in order to determine whether process or reject the requested operations.

Moreover, this Unit maps subscribers' IMB Account Management operations also to IMB Accounting Database query operations. Accounting information is created and managed exclusively by the IMB System in a protected manner. Only for exceptional cases (and with the authorisation of the corresponding subscribers), system administrators can be allowed to modify accounting information (e.g. in the case of a dispute over a bill). This SW Unit will therefore take care of providing accounting information update procedures only to authorised personnel.

On the other hand, in order to protect subscribers' own sensitive and proprietary data (like passwords, secret keys, etc.) that are stored in either of the two aforementioned databases, system administrators/IMB Service Providers should be prevented from performing any query and update operations on such information. IMB Service Provider should be simply allowed to create and delete subscribers' sensitive information. For this purpose, the IMB Service Contract shall make provisions of special rules for determining implicit contractual expiration terms, if any.

Both this Unit and the core MB routing functionality use a couple of Database Access Client Sub-Units, one for the User Profile Database and one for the Accounting Database: each of these Sub-Units co-ordinates all the corresponding database accesses.

This SW Unit finally manages the transmission of the results of the requested operations, back to the subscriber.

User Profile Database Access Client Unit

IMB Database Units

These units contain the key information of the overall IMB system, expressed in term of the EMPP data model, as described above. These SW Units can be implemented by either using COTS Database management systems, or as proprietary solutions. In either case, the most stringent requirement to cope with is the fact that IMB Systems are envisioned to deal with large amount of traffic with extremely high availability constraints. Therefore COTS solutions are preferred, as they provide proven high performance solutions.

The Databases are structured so as to accommodate the IMB User Spaces, according to the EMPP model, into the specific technology of choice. For example, proper mapping of the EMPP to Relational Database models is envisioned to be the most common solution, given that many well known COTS solution implement, the relational model. Another alternative solution may be based on Sun Microsystems' (pure Java) Javaspace, a high-level process co-ordination tool based on the Tuple Space concept.

As an example, a possible mapping of the EMPP model to a Relational Database data model is offered in the following table:

TABLE I

Example of EMPP Data Model flattening onto a single-table Relational Database

| Key (P-key) | | | | | | | | |
|---|---|---|---|---|---|---|---|---|
| | Key Resolution | Component Name | | | | | | |
| Key Name | Rule | User | Terminal | Network | Application | Situation | Location | Value |
| terminal.monitor.speed | Override | Jack | PDA xyz | Wireless IP | Calendar | Work | Dealer HJK | 9600 bps |
| terminal.monitor.speed | Override | Jack | PDA xyz | Default | Default | Default | Default | 4800 bps |
| terminal.monitor.speed | Override | Bill | Mobile Phone | GSM | Default | On Vacation | Lisboa | 2400 bps |
| terminal.monitor.speed | Override | Default | Mobile Phone | GSM | Default | On Vacation | Default | 1200 bps |
| terminal.monitor.size | Lock | Default | Mobile Phone | GSM | Default | On Vacation | Default | 2" |

The MB Database Access unit communicates with the User Profile Database through a logical channel. This channel interfaces with the MB Database Access Unit across the User Profile Database Access Unit. Such SW Unit regulates channel access and encapsulate implementation details (which can vary, depending whether the database is accessed locally—e.g. through IPC mechanisms—or remotely—e.g. through TCP/IP connections). Irrespective of the channel implementation, any communications across it is guaranteed to be secure.

IMB Accounting Database Access Client Unit

The MB Database Access unit communicates with the IMB Accounting Database through a logical channel. This channel interfaces with the MB Database Access Unit across the IMB Accounting Database Access Unit. Such SW Unit regulates channel access and encapsulate implementation details (which can vary, depending whether the database is accessed locally—e.g. through IPC mechanisms—or remotely—e.g. through TCP/IP connections). Irrespective of the channel implementation, any communications across it is guaranteed to be secure.

Example of EMPP Data Model flattening on a single-table Relational Database

User Profile Database Access Server Unit

The User Profile Database Access Server Unit communicates over secure data channels with the User Profile Database Access Client Unit, and provides the basic functionality for accessing the User Profile database through read-write operations.

IMB Accounting Database Access Server Unit

The IMB Accounting Database Access Server Unit communicates over secure data channels with the IMB Accounting Database Access Client Unit, and provides the basic functionality for accessing the IMB Accounting, database through read-write operations.

The main advantageous differences between the invention and the state of the art Following is a list of advantages offered by this invention with respect to the state of the art.

1. Direct access to personal IMB User Profile information, including Accounting information.

2. A customisable logical User Space, which subscribers can use for creating and/or modifying existing User Profiles, depending on the changes in the environment in which they act. The environment can represent a physical location (e.g. a hotel or an airport), or a logical context (e.g. "home" Vs. "work"). Environment changes may be a partial (whenever the set of terminal devices available in the environment, changes for some reasons—e.g. a new Telefax machine is made available, or a GSM phone number is changed), or global (the subscriber moves from one environment to another).
3. The original EMPP model is well suite for distributing information across multiple SW (processes, OS ) and/or HW Units (computers).
4. Subscribers can extend User Space content, as soon as terminal devices and/or new technologies are available.
5. User Spaces can be seamlessly used across various environments.
6. Within a given environment, subscribers can alter terminal device priority (which indicates to the MB which terminal device the incoming information should be preferably sent to), through the concept of presence token signalling. The token multiplicity can be greater than one, so that one can simultaneously receive an Instant Message on multiple devices, at an additional charge.
7. More complex applications (like a calendar for generating appointment notices, wake-up calls, etc.) can be integrated within the IMB System, by interfacing the latter with additional IMB Units (performing the given application) and/or with COTS tools (such as Microsoft Outlook, continuing the calendar example). In such cases, application specific data should be introduced within the User Profile, so as to instruct the IMB System how to use the external application for processing data.

Another example of such plug-able applications would be the integration of a language translator: the IMB MB will use an external translator application for determining the final content of the IMB to send. In all these (and many other similar) cases, this invention plays a key role, insofar as the hereby-presented User Profile Database structure is flexible enough to accommodate any subscriber custom information, in a format which is well suite for a distributed processing environment, like the IMB System is.

By extending the rationale used in the previous paragraphs, IMB subscribers can not only customise their applications of choice, but even name them with mnemonics, i.e. easy to remember logical names (e.g. my_calendar, german_to_english_translator, etc.)

8. This approach paves the way to neat integration between IMB Services and Mobile Ad-Hoc Network environments: environment changes can be automatically detected and signalled to the IMB System. This mechanism allows fast adaptive behaviour of the system, which can be compared somehow to the mobile phone hand-over mechanism. However, this invention addresses a much broader set of services than the pure telephone ones.

EXAMPLE

As described in the previous paragraphs, this invention copes with the need to address and exploit the mutable characteristics of a typical IMB service scenario (also known as an IMB mutable environment, see FIG. 13).

IMB subscribers can be contacted anywhere, insofar as they can travel (i.e. being reachable at different locations/offices) and/or they can reconfigure their set of available terminal devices at any given time.

In the example of FIG. 13 a Calling Party located in Moscow tries to send an IM to the businessman HJK (i.e. the Called Party), by connecting to the IMB System through a web interface (by using a PC with an Internet access). The Calling Party does not know where the businessman is currently located. All the Calling Party knows is the businessman's UN (e.g. HJK@sony.de).

Based on the information stored in the User Profile Database, the IMB System resolves the businessman's (i) Active Context and (ii) the current terminal device.

Once got such information, the IMB System can finally forward the IM (within the proper data format, as prescribed by the selected terminal device) to the Called Party.

The Called Party can move to different locations (e.g. Company XYZ in Stuttgart), and or to different situations (on trip—he can use only a mobile phone and a wireless networked laptop—or at home). One can easily see why the Active Context is a loose concept. For instance, the home situation can span different locations: the businessman can choose that his Active Context home maps to his physical home and his office located in the Company XYZ premises, in Stuttgart.

On the other hand, the hotel ABC in Los Angeles can become a new businessman's home for the whole duration of a certain business. Therefore, the businessman can decide to map a single location (hotel in Los Angeles) to two contexts, home (for private messaging), and on trip (for business matters).

At any time, the businessman can use the hereby-presented invention to configure his IMB User Profile; in order to address all these features. Moreover, he can force the IMB System to redirect IMS to remote locations (e.g. send always a carbon copy of any incoming IM to the Telefax machine at the—physical—home). This goal can be easily accomplished by using the token concept.

The invention claimed is:

1. A computer implemented database for storing and managing user profile data representing sets of different terminal devices via which a user can be reached, in an information transmission network, wherein the database comprises respectively for each user a plurality of pre-configured user profiles which can be created, edited and/or deleted by the user, and each of the plurality of customizable user profiles are associated with a logical context of the user defining a particular situation of said user, a user can activate only one of the plurality of user profiles at one time, the activated user profile indicating the terminal device or devices out of the set of terminal devices over which the user desires to be informed at the present logical context, the user sends selection information to the user profile database in order to activate the terminal device or devices out of the set of terminal devices over which the user desires to be reached, the database includes one presence token or a plurality of presence tokens for each user, each presence token representing the availability of a user at a predetermined terminal device, the user profiles are implemented as sets of properties, and each card has a property key identifying a given profile property and a property value corresponding to a given property content.

2. The computer implemented database according to claim 1, further comprising: at least one default user profile for each user, wherein the default user profiles cannot be deleted by the user.

3. The computer implemented database according to claim 2, further comprising: a hierarchical scheme of the user profiles is a tree, the default user profile being the root of the tree.

4. The computer implemented database according to claim 1, further comprising: a priority information associated with each terminal device of a user profile.

5. The computer implemented database according to claim 1, wherein the database contains information on an access network, a network address and characteristics of each terminal device.

6. The computer implemented database according to claim 1, wherein a mnemonic is attributed with each terminal device.

7. The computer implemented database according to claim 1, wherein a unified name is attributed with each user.

8. The computer implemented database according to claim 1, wherein a user can directly inquire accounting information.

9. A method for directing information to a terminal device, the method comprising the following steps:
providing a computer implemented user profile database for storing user profile data representing sets of different terminal devices via which a user can be reached, in an information transmission network,
wherein the database comprises respectively for each user at least one customizable user profile which can be created, edited and/or deleted by the user, and
each customizable user profile is associated with a logical context of the user defining a particular situation of said user,
activating only one of the plurality of user profiles at one time, the activated user profile indicating the terminal device or devices, out of the set of terminal devices over which the user desires to be informed at the logical context, and
transmitting information from a sender to a terminal device comprised in the activated user profile,
wherein the user sends selection information to the user profile database in order to activate the terminal device or devices out of the set of terminal devices over which the user desires to be reached,
the database includes one presence token or a plurality of presence tokens for each user, each presence token representing the availability of a user at a predetermined terminal device,
the user profiles are implemented as sets of properties, and
each card has a property key identifying a given profile property and a property value corresponding to a given property content.

10. The method according to claim 9, further comprising: at least one default user profile for each user is provided, wherein the default user profiles cannot be deleted by the user.

11. The method according to claim 10, further comprising: a hierarchical scheme of the user profiles is a tree, the default user profile being the root of the tree.

12. The method according to claim 9, further comprising: a priority information associated with each terminal device of a user profile.

13. The method according to claim 9, wherein the database contains information on an access network, a network address and characteristics of each terminal device.

14. The method according to claim 9, wherein a mnemonic is attributed with each terminal device.

15. The method according to claim 9, wherein a unified name is attributed with each user.

16. The method according to claim 9, wherein the database content is stored in cards in a distributed fashion.

17. The method according to claim 9, wherein a user can directly inquire accounting information.

18. A computer implemented database for storing and managing user profile data representing sets of different terminal devices via which a user can be reached, in an information transmission network, wherein
the database comprises respectively for each user a plurality of pre-configured user profiles which can be created, edited and/or deleted by the user, and
each of the plurality of customizable user profiles are associated with a logical context of the user defining a particular situation of said user,
a user can activate only one of the plurality of user profiles at one time, the activated user profile indicating the terminal device or devices out of the set of terminal devices over which the user desired to be informed at the present logical context,
the user sends selection information to the user profile database in order to activate the terminal device or devices out of the set of terminal devices over which the user desires to be reached,
the user profiles are implemented as sets of properties,
the database includes one presence token or a plurality of presence tokens for each user, each presence token representing the availability of a user at a predetermined terminal device,
each card has a property key identifying a given profile property and a property value corresponding to a given property content; and
the selection information sent by the user to the user profile database represents a logical context.

19. A method for directing information to a terminal device, the method comprising the following steps:
providing a computer implemented user profile database for storing user profile data representing sets of different terminal devices via which a user can be reached, in an information transmission network,
wherein the database comprises respectively for each user at least one customizable user profile which can be created, edited and/or deleted by the user, and
each customizable user profile is associated with a logical context of the user defining a particular situation of said user,
activating only one of the plurality of user profiles at one time, the activated user profile indicating the terminal device or devices, out of the set of terminal devices over which the user desires to be informed at the logical context, and
transmitting information from a sender to a terminal device comprised in the activated user profile,
wherein the user sends selection information to the user profile database in order to activate the terminal device or devices out of the set of terminal devices over which the user desires to be reached,
the database includes one presence token or a plurality of presence tokens for each user, each presence token representing the availability of a user at a predetermined terminal device, the user profiles are implemented as sets of properties, each card has a property key identifying a given profile property and a property value corresponding to a given property content, and the selection information sent by the user to the user profile database represents a logical context.

* * * * *